United States Patent [19]

Porter

[11] Patent Number: 5,148,635

[45] Date of Patent: Sep. 22, 1992

[54] METHOD AND APPARATUS HYDRAULIC TURBINE REPAIR

[75] Inventor: Benny R. Porter, Chattanooga, Tenn.

[73] Assignee: Arc Plan, Inc., Chattanooga, Tenn.

[21] Appl. No.: 667,439

[22] Filed: Mar. 11, 1991

Related U.S. Application Data

[63] Continuation of Ser. No. 397,051, Aug. 22, 1989, abandoned.

[51] Int. Cl.⁵ .............................................. B24B 21/02
[52] U.S. Cl. ................... 51/135 R; 51/241 S; 51/290; 51/241 B
[58] Field of Search ............. 51/135 R, 415, 245, 51/290, 72 R, 98 R, 241 S, 241 B; 82/113, 128

[56] References Cited

U.S. PATENT DOCUMENTS

| | | |
|---|---|---|
| 2,546,225 | 3/1951 | Julian et al. |
| 2,818,685 | 1/1958 | Becker. |
| 3,521,346 | 7/1970 | Tongurian. |
| 3,704,500 | 12/1972 | Okamoto. |
| 3,711,927 | 1/1973 | Davidson. |
| 3,793,698 | 2/1974 | Goings. |
| 3,923,418 | 12/1975 | Chacour. |
| 3,988,126 | 10/1976 | De Musis .......................... 51/217 R |
| 4,028,788 | 6/1977 | DeMusis ........................ 29/156.8 B |
| 4,095,451 | 6/1978 | Watton ......................... 29/156.8 B |
| 4,121,894 | 10/1978 | Cretella et al. |
| 4,285,108 | 8/1981 | Arrigoni ....................... 29/156.8 B |
| 4,884,326 | 12/1989 | Porter et al. ........................ 82/117 |

OTHER PUBLICATIONS

Porter et al., U.S. Pat. application Ser. No. 07/325,762 filed Mar. 20, 1989, entitled Method and Apparatus for Hydraulic Turbine Rotation for Repair (Application has now been allowed and is awaiting issuance.

Primary Examiner—Robert A. Rose
Attorney, Agent, or Firm—Varnum, Riddering, Schmidt & Howlett

[57] ABSTRACT

A method and apparatus is disclosed for use in a hydraulic assembly (1) for purposes of repairing and resurfacing of turbine liner walls (8) pitted as a result of cavitation and the like. The method includes rotation of turbine blades (6) and a turbine shaft (2) through a turning mechanism (18) positioned on a blade (6), so the turning forces are exerted directly between the turning mechanism and the surface of the liner wall (8). The method and apparatus further includes the use of a repair assembly (16) mounted to the turbine blades (6) for selectively positioning a grinding mechanism (104) adjacent the liner wall (8) for grinding and sanding the same. The grinder mechanism (104) includes components for selectively adjusting horizontal and vertical positioning of the mechanism (104). The horizontal and vertical positioning components can also be employed with other mechanisms for performing repairing and resurfacing operations.

20 Claims, 15 Drawing Sheets

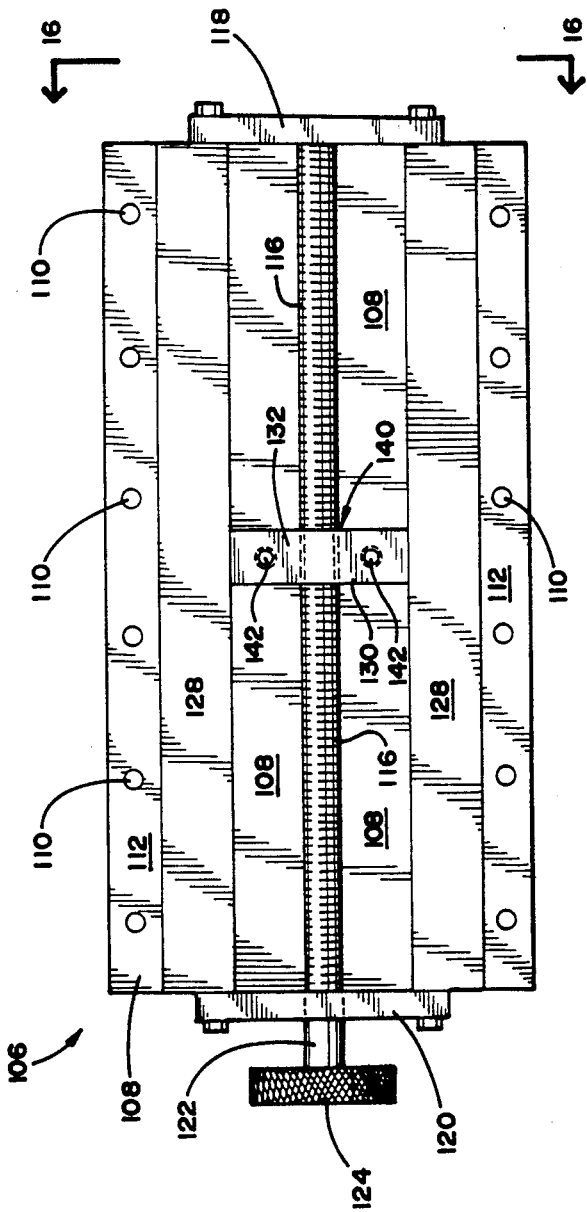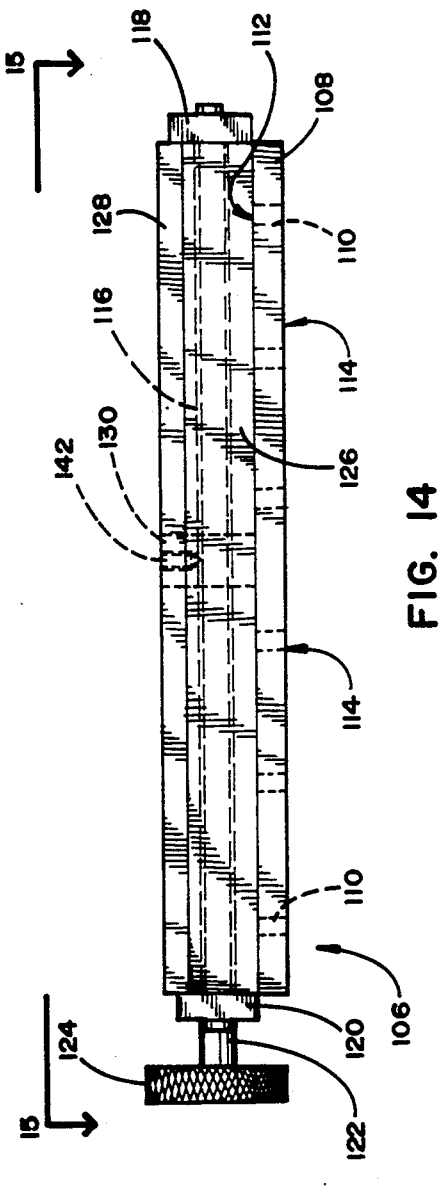

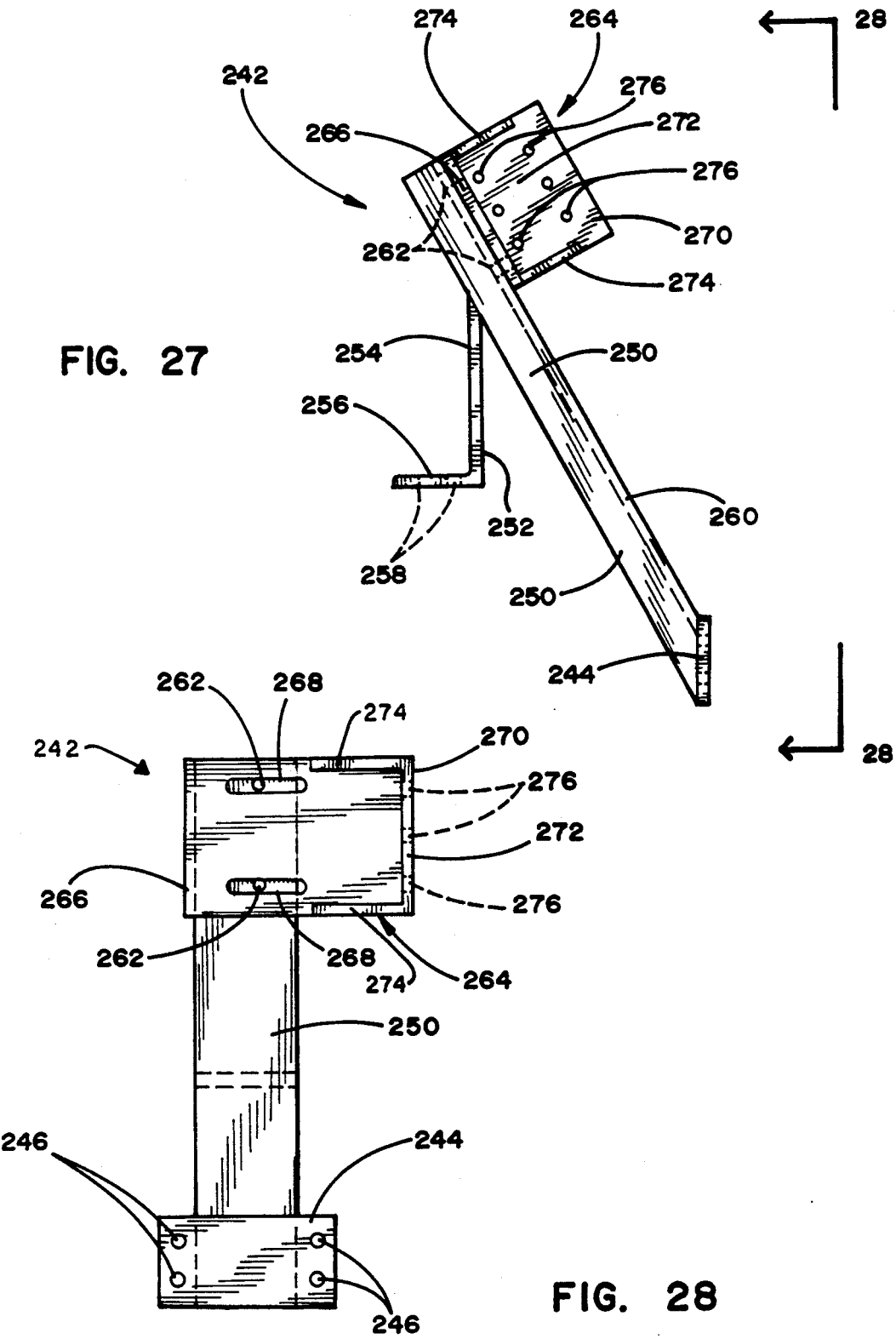

METHOD AND APPARATUS HYDRAULIC TURBINE REPAIR

This is a continuation-in-part of application Ser. No. 07/397,051 filed Aug. 22, 1989 now abandoned.

DESCRIPTION

1. Technical Field

The invention relates to the repair of hydroelectric assemblies and, more particularly, relates to methods and apparatus mountable to hydroelectric turbine blades for selectively providing repair functions.

2. Background Of The Invention

Historically, hydroelectric facilities have been utilized for purposes of generating electricity through the use of power resulting from movement of water through gravitational forces. Such facilities can comprise one or more electrical generator units, with each unit powered by a hydraulic turbine mechanism.

Modern hydroelectric facilities typically are designed around a vertically mounted shaft. Attached to the upper portion of the shaft is a generator rotor. Correspondingly, a hydraulic turbine assembly is typically attached adjacent the lower portion of the shaft, and comprises a series of turbine blades. The water enters the area of the turbine mechanism at a point above the turbine blades. Through gravitational forces, the movement of the water causes the rotation of the turbine blades at a speed sufficient so as to cause the generator portion of the facility to appropriately generate electricity.

The internal environment of the hydroelectric turbine assemblies is relatively severe. That is, the turbine blades are subjected to relatively large stresses resulting from the water movement and blade rotation. In addition, the walls surrounding the turbine blades, typically characterized as the liner wall, are also subjected to severe stresses.

Such stresses are commonly explained in accordance with known principles of fluid mechanics. For example, the water flow within a hydraulic turbine will cause a phenomenon known as "cavitation." This phenomenon will subject fluid flow surfaces (e.g. liner walls and turbine blade surfaces) to intense local stressing, which appears to damage flow surfaces by fatigue. Cavitation within a hydraulic turbine will result in pitting and general surface deterioration of liner walls and blades.

The principles of cavitation and other fluid mechanics stress phenomenon are relatively well-known, and are explained in conventional texts such as Streeter, *Fluid Mechanics* (McGraw-Hill 1966, 4th Ed.). Cavitation occurs in a flowing liquid whenever the local pressure of the liquid falls to the liquid vapor pressure. When this point is reached, local vaporization of the liquid will result, causing a hole or cavity in the flow of the liquid. The cavity contains a swirling mass of droplets and vapor. When the pressure exerted on the flowing liquid is raised above the vapor pressure of the liquid, the low-pressure cavity rapidly collapses and the surrounding liquid rushes in to fill the void. At the point of disappearance of the cavity, the inrushing liquid comes together and momentarily raises the local pressure within the liquid to a very high level. When the point of collapse of the cavity is in contact with a metal surface, the surface may be stressed locally beyond its elastic limit, resulting eventually in fatigue, pitting and destruction of the material. In a hydroelectric facility, cavitation occurs on the turbine blades and the interior walls or lining of the turbine in the area of the turbine blades. Typically, cavitation erosion on the surfaces in a hydroelectric facility must be repaired relatively frequently, e.g. once per year.

A common method for repairing cavitation erosion on turbine wall surfaces is to remove the heavily-pitted material by various grinding means, and then replace this removed material by a welding process. In the past, such repair has been accomplished by various hand-held grinding tools and replacing the ground material by welding stainless steel to the ground surfaces. These conventional methods of repair are extremely slow and expensive due to the lengthy down-time of the hydroelectric unit being serviced.

An attempt to speed up this repair process is disclosed in the U.S. Pat. No. 3,793,698 issued Feb. 26, 1974 to Goings. The Goings '698 patent is incorporated herein by reference. The Goings '698 patent discloses a semi-automatic method and apparatus for machining and welding the liner of a hydroelectric structure. The Goings apparatus includes machining tooling installed on a lower portion of the hydroelectric shaft, such that the tooling is brought into operative engagement with the tube wall or liner.

The generator portion of the hydroelectric structure disclosed in the Goings '698 patent comprises a rotor which is moved by the runner or rotor of a hydraulic turbine. Gates control the entry of water into the draft tube of the turbine, with the blades of the turbine runner positioned within the upper cylindrical portion of the draft tube. The rotational axis of the turbine runner is concentric with the rotational axis of the rotor of the generator. The generator rotor has an extending portion which carries an annular shoe adapted to cooperate with an adjacent member which provides for braking the movement of the rotor, in the event of a failure or other emergency.

For purposes of repair, a temporary floor structure is constructed across the draft tube below a runner hub. A collector ring assembly is attached to the lower end of the runner, with the collector ring providing for transference of electrical power and pneumatic lines into the runner.

An external power unit is installed adjacent the extending portion, which rotates with the generator rotor. This power unit can include an electric motor having V-belts which drive a roller or traction member engaging the adjacent face of the annular track carried by the generator rotor portion. A control panel provides for control of the drive motor. Through reduction gearing between the motor and the traction member, energization of the motor results in a rotational force being applied to the generator rotor shaft and, correspondingly, to the runner shaft and runner. During rotation, machining and welding operations can be carried out on the draft tube liner.

In addition to the arrangement for exerting rotational forces on the generator rotor, the Goings arrangement also includes a series of support members temporarily welded to the surface of one of the runner blades. These support members mount a vertical member on which travels a cutting or machining tool holding head. The holding head can be adjustably positioned along the vertical member by means of an adjustment wheel. In addition, the structure also includes a seat for an operator riding the structure and observing the machining operation. A machining tool is adapted to extend from the tool holding head into a machining engagement with the adjacent draft tube wall surface.

In operation, scaffolding is temporarily attached to and supported by the runner blades. The scaffolding is utilized to support welding apparatus, including a welding rod supply reel. The scaffolding structure also carries a vertical member which supports a vertically movable welding head. The welding head is adjustably movable in a vertical direction along the vertical member. A second operator seat is provided for purposes of observing the welding operation. As the turbine runner is rotated, the welding head is made to traverse the curved surface of the tube wall. The arrangement of the scaffolding and the welding equipment is such that a welder can weld pitted areas of the blades as the rotation of the turbine runner proceeds.

After conditioning equipment, such as the cutting tool and the welding head, have been installed, the turbine runner can be rotated by the rotational mechanism previously described. Material of the draft tube wall can be machined off to a desired depth. Weld material, such as stainless steel, can then be applied to the wall. Also, a carbon-steel build-up layer can be initially applied to the wall, and subsequently covered by the stainless steel surface. The tube surface can then subsequently again be machined so as to smooth the stainless steel build-up. Further, severely damaged outer edges of the blades can have sections removed, and the gaps renewed with stainless steel sections. Such operations on the blades are carried out by an operator utilizing hand-held tools, while the machining and welding of the tube surface is performed as the turbine runner is rotated.

While the Goings '698 patent structure has provided advantages in operation over previously-known arrangements for on-site repair of hydroelectric turbine surfaces, several problems still exist with respect to the method of operation of the Goings repair arrangement. For example, with the particular structure utilized in the Goings arrangement, and with the rotational forces applied to the generator rotor, it has been found that rotation of the turbine shaft and the machining tooling mounted to the turbine blades can be relatively jerky and erratic. According, a relatively severe amount of chatter and vibration can occur during the machining operation.

Further, with the forces exerted directly on the generator rotor relatively far above the turbine blades, the rotational system is far removed from the location of the machining operations. Therefore, the rotational system is not convenient for purposes of precise and spontaneous adjustments of the rotation speed. Still further, with the positioning of the application of rotation forces at the perimeter of the generator rotor, a relatively substantial force is required to achieve appropriate rotational speed. Accordingly, motors of substantial size must be employed. Correspondingly, the motor apparatus for exerting the rotational forces is relatively bulky and expensive. The bulkiness can cause substantial problems and expense, with respect to transportation and assembly of the apparatus at a job site.

A substantial advance in the state-of-art of hydraulic repair systems has been achieved as disclosed in the co-pending and commonly-assigned U.S. patent application Ser. No. 07/325,762, Porter et al, filed Mar. 20, 1989. The Porter et al patent application describes a method and apparatus primarily directed to rotation of a hydroelectric assembly for purposes of repairing and resurfacing of turbine liner walls pitted as a result of cavitation. The method is adapted for use in a hydroelectric turbine structure comprising a turbine shaft, generator rotor assembly coupled to an upper portion of the shaft and a turbine blade assembly coupled to a lower portion of the shaft. The turbine blade assembly includes a plurality of turbine blades extending radially from the turbine shaft. A turbine chamber having a substantially cylindrical configuration is formed by a vertically-disposed liner wall adjacent distal ends of the turbine blades.

The method includes removing water from the turbine chamber, and mounting a repair assembly at or substantially adjacent a distal end of at least one of the turbine blades. The repair assembly can include conditioning devices for repairing surface deterioration of the liner wall. A turning apparatus is mounted at or substantially adjacent a distal end of at least one of the turbine blades. The turbine blades and turbine shaft are slowly rotated by exerting forces directly between the turning apparatus and the liner wall, thereby causing the conditioning devices to traverse the liner wall.

The mounting of the turning apparatus includes the mounting of a support assembly directly to one of the turbine blades. A turning wheel is mounted in a pivotable configuration relative to the support assembly. The turning wheel is engaged with the liner wall so as to be in frictional contact therewith. Rotational forces are then exerted on the turning wheel to rotate the turning wheel, thereby causing the turning wheel to traverse the liner wall, and further causing rotation of the turbine blades.

The turning apparatus includes a support structure adapted to be mounted to at least one of the turbine blades. The support structure includes first and second support braces, with each of the braces having one end secured adjacent a distal end of at least one of the turbine blades. A first pivot assembly is then pivotably coupled to an upper end of the support brace and to a distal end of a piston cylinder rod, so that the piston mechanism is pivotable in a pitch mode relative to a horizontal plane extending through the piston cylinder rod. A turning mechanism mounting bracket is also provided, and a second pivot assembly is provided to pivotably couple one end of the piston cylinder with one end of the mounting bracket. A third pivot assembly can pivotably couple another end of the mounting bracket to an upper end of the second support brace.

In accordance with the Porter et al arrangement, the rotation of the turbine blades and turbine shaft by operation of a turning wheel directly against the liner wall provides a requisite "steady" rotational movement for purposes of undertaking repairs of the liner wall. Further, with the position of the turning mechanism adjacent a distal end of one of the blades, the mechanical advantage provided by this positioning is substantial. Accordingly, a relatively small motor drive assembly can be employed for providing the requisite rotation of the turbine blades, notwithstanding the massive size of conventional turbine blades and turbine shafts. Exerting forces between the turbine turning mechanism and the liner wall in the manner as described in the Porter et al arrangement provides a substantial advantage over other arrangements, whereby the turbine blades are rotated through externally-generated forces which must be translated through the turbine shaft.

Various types of machining and grinding mechanisms are relatively well-known and adapted for performing such functions in applications other than hydraulic turbine repair. For example, U.S. Pat. No. 2,546,225 issued to Julian et al, Mar. 27, 1951, is directed to a machine for grinding the worn wheels of locomotives and cars. Referring to FIGS. 1-4, the patent describes a pair of shafts which are parallel and threadably mounted in a pair of wheel cradles. The cradles have axle-mounted rollers which supportively engage the rim of a railroad car wheel. The wheel is rotated by a motor and, during rotation, can be reconditioned by a grinding mechanism.

U.S. Pat. No. 2,818,685 issued to Becker, Jan. 7, 1958, is directed to an apparatus for turning the crank pin of a large crankshaft for honing of the crank pin without removing the crankshaft from its engine. Referring to FIGS. 1, 2, 3, 6 and 7, the apparatus comprises a pair of adapters which are adjustably mounted on the peripheries of a pair of crankshaft webs. These adapters surround the crank pin upon which the turning and honing operation is to be performed. The adapters are provided with eccentric bearing rings. The rings are located concentrically with the axis of the crank pin by means of a centering chuck. A circular turning and honing machine is rotatably mounted upon the rings between the webs for purposes of accomplishing the turning and honing operations.

U.S Pat. No. 3,521,346 issued to Tongurian, Jul. 21, 1970, discloses a machine for reconditioning and setting up clutches of motor vehicles and the like. Referring to FIG. 1, the patent describes a table which has a circular opening therein in which a face plate is mounted in a freely-rotatable manner. The face plate is designed to simulate the fly wheel of a motor engine. A fixed post extends through the center of the table and the center of the face place. The Tongurian arrangement also includes a plurality of clamping members designed to engage portions of the cover of a clutch assembly being tested, and to clamp the assembly firmly to the face plate during the testing operation. In addition, the clamping members are designed such that they may be adjusted simultaneously, radially inward and outward on the face plate. Also, a hydraulic arrangement is provided to raise and lower the clamping members.

U.S. Pat. No. 3,704,500 issued to Okamoto, Dec. 5, 1972, is directed to a method of adjusting the number of revolutions of a screw propeller. Referring to FIGS. 1-3, the method comprises the steps of cutting the trailing edge of each blade of the propeller from and along the trailing edge, and working and shaping the face of the blade to a curvature to provide a proper setback. The method corrects the twist which occurs on fixed-pitch screw propellers after several years of service. This twist requires an increase in the number of revolutions of the propeller to maintain hull speed of a ship.

U.S. Pat. No. 3,711,927 issued to Davidson, Jan. 23, 1973, discloses a method and apparatus for reconditioning the pivot connection between a railway car body and a railway car truck, where the reconditioning is effected on-site on a railway track. In this arrangement, the connection between a railway car and the railway truck comprises a center plate boss which cooperates with the center plate socket of the truck, and a vertical pin supported in a centrally-located and generally vertical extending socket in the center plate socket. When the center plate boss is assembled with the pocket, the pin telescopingly projects into a central and vertically-extending aperture of the boss.

Reconditioning of the pivot connection is accomplished by removing the truck from the car body. A center plate machining tool is then mounted in an engaging relationship with the center plate boss. The center plate boss machining tool is used to remove the worn boss periphery, such that a new surface may be installed on the periphery of the boss by attaching a wear ring.

The truck-carried center plate pocket may also be reconditioned by this arrangement. The worn surface of the pocket is removed by a center plate pocket machining tool. After this worn surface has been removed, a wear ring is installed.

The center plate machining mechanism includes a plurality of cutters which are mounted to a rotatable column. A driving force is applied to the exterior of the rotatable column such that the cutters are brought into engagement with the worn surface of the center plate boss. The center plate pocket machining mechanism includes basic components which closely correspond to the structure and function of the components of the center plate boss machining mechanism. This mechanism includes cutters which are brought into contact with the interior worn surfaces of the center plate pocket. The cutters are rotated about the center axis of the center plate pocket by a drive arrangement.

U.S. Pat. No. 3,923,418 issued to Chacour, Dec. 2, 1975, discloses a structure and method for installing a turbine head cover into the turbine pit of a hydroelectric turbine facility. As shown in FIGS. 1-6, the turbine head cover is composed of two half sections. The half sections incorporate a number of strategically located lifting points which allow for the mounting of the head covers in the turbine pit. The opening to the turbine pit is typically smaller than the diameter of the head cover and, therefore, the head covers must be inserted in a manner to accommodate this narrow opening. The first head cover half section is lowered into the opening of the pit at an angle that will accommodate the head cover. Once the head cover is past the opening, the support cables may be altered to align the head cover on a horizontal plane. The head cover can then be mounted on an appropriate mounting arrangement. The second head cover is installed in a like manner.

U.S. Pat. No. 4,121,894 issued to Cretella et al, Oct. 24, 1978, discloses a method for recovery of worn turbine components, such as the reworking and resurfacing of worn veins or blades so as to extend the useful life thereof. This process is accomplished by a procedure which first welds closed all cracks, pitted areas and the like. The trailing edge of the vein or blade is then built up, by welding, to at least its original dimension. In addition, worn surfaces of the components are built up by a plasma spray process using powdered metal with added silica. Another operation disclosed in the patent is a slotting of the veins or blades prior to appreciable build-up of the surfaces so as to prevent distortion. Later, the slots are welded closed. Finally, the air foil surfaces are re-cut to conform to the original contours, and any cooling holes are then cut through in accordance with original specifications.

SUMMARY OF THE INVENTION

In accordance with the invention, an apparatus is adapted for use in a hydroelectric turbine structure. The structure includes a turbine shaft, a generator rotor assembly coupled to an upper portion of the shaft, a turbine blade assembly coupled to a lower portion of the shaft and a series of turbine blades extending radially from the shaft. The structure also includes a turbine chamber having a cylindrical configuration formed by a vertically disposed turbine liner wall adjacent distal ends of the turbine blades.

The apparatus includes means for rotating the turbine blades and the turbine shaft to facilitate repair of pitting and general deterioration of surfaces of the wall. A vertical support structure is mounted to one or more of the turbine blades substantially adjacent the liner wall. The apparatus includes a grinder contact wheel and a grinding belt coupled around the grinder wheel. Energizing means are provided for selectively rotating the grinder contact wheel and, correspondingly, the grinding belt.

In addition, support means are provided for mounting the grinder contact wheel, the grinding belt and the energizing means. Adjustable connection means are coupled to the support means and to the vertical support structure for mounting the grinder contact wheel to the support structure. The connection means is also provided for adjusting the horizontal position of the grinder contact wheel relative to the vertical support structure, with the adjustment being in a radial direction relative to the shaft. Further, the vertical support structure includes additional adjustable connection means coupled to the adjustable connection means for adjusting the vertical position of the grinder contact wheel relative to the vertical support structure.

BRIEF DESCRIPTION OF THE DRAWINGS

The invention will now be described with respect to the drawings, in which:

FIG. 14 is a side elevation view of the motor adjusting slide of the grinder mechanism;

FIG. 15 is a plan view of the motor adjusting slide, taken along lines 15—15 of FIG. 14;

FIG. 27 is an elevation view of the upper wheel support bracket of the grinder assembly; and FIG. 28 is a side view of the upper wheel support bracket shown in FIG. 27, taken along lines 28-28 of FIG. 27.

DESCRIPTION OF THE PREFERRED EMBODIMENT

The principles of the invention are disclosed, by way of example, in a hydroelectric facility turbine structure 1 as illustrated in FIGS. 1-28. As will be described in subsequent paragraphs herein, and in accordance with the invention, a turbine repair assembly can be provided with the turbine structure 1 for purposes of repairing damage to turbine liner walls and blades, where the damage comprises pitting and other surface deterioration caused by phenomenon such as cavitation. In particular, the repair arrangement in accordance with the invention comprises an assembly directed to the repair of cavitation erosion of the turbine liner wall, particularly with respect to grinding of metal from the liner wall.

Prior to describing details of the repair assembly in accordance with the invention, a description of the hydroelectric turbine structure 1 and associated components for turning the turbine blades will be described. The turbine turning mechanism described herein is substantially disclosed in the co-pending and commonly assigned U.S. patent application Ser. No. 07/325,762. However, it should be emphasized that the repair assembly as described and claimed herein can be employed with various other types of turbine turning mechanisms, and is not limited to use with the specific turning mechanism described herein.

Figure 1:
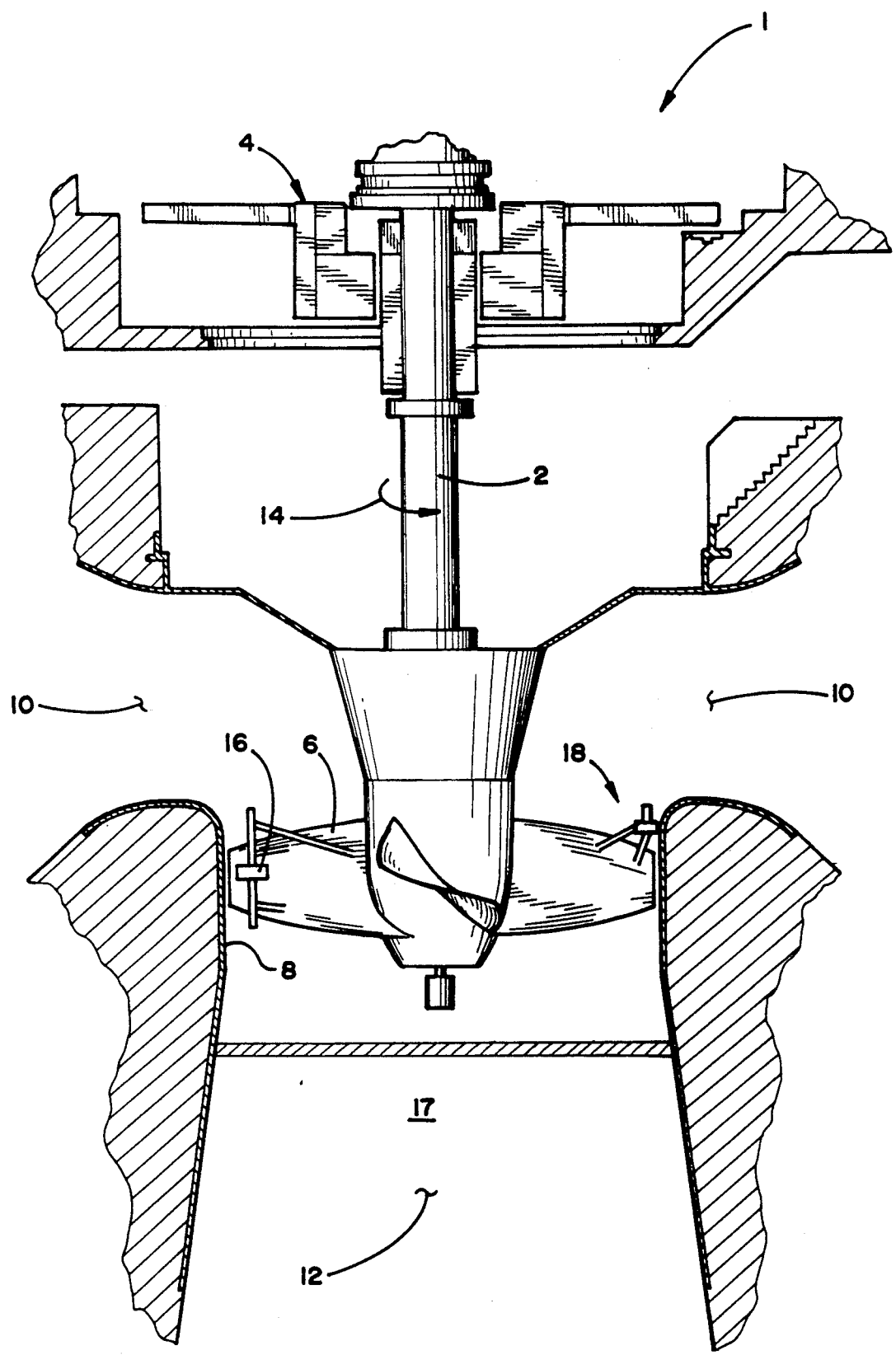
FIG. 1 is a sectional view generally illustrating a hydroelectric facility and generally showing the positional relationship of repair and rotational apparatus, relative to other components of the hydroelectric facility.

Turning to FIG. 1, the hydroelectric turbine structure 1 comprises a vertically mounted turbine shaft or hub 2 with a generator rotor assembly 4 mounted thereto. The generator rotor assembly 4 is a conventional assembly adapted for creation of electricity as the result of rotation. As further shown in FIG. 1, the generator rotor assembly 4 is typically mounted at the uppermost portion of the turbine shaft or hub 2.

Adjacent and interconnected with the lower portion of the turbine shaft 2 is a series of turbine blades 6, two of which are illustrated in FIG. 1. The turbine blades 6 are mounted typically in a "pitched" configuration so that the terminating ends thereof are in close proximity to a turbine liner wall 8. The turbine liner wall 8 is typically constructed in the shape of a cylinder and is generally composed of a wear-resistant and corrosion-resistant steel.

Although not specifically illustrated in FIG. 1, the turbine structure 1 will typically also include a series of gates for controlling the entry of water into an inlet channel 10. The inlet channel 10 is positioned above the turbine blades 6. As a result of gravitational forces, the water flowing into the inlet channel 10 will fall downwardly and flow over the turbine blades 6 into a discharge channel 12. Pressures exerted by the flow of water on the turbine blades 6, with the relative pitch of the turbine blades 6, will cause the entirety of the turbine shaft assembly to rotate in the direction of arrow 14 as further illustrated in FIG. 1. This rotation of the turbine shaft assembly in the direction of arrow 14 will cause corresponding rotation of the generator rotor assembly 4. Rotation of the generator rotor assembly 4 will, through conventional means, cause the generation of electricity.

As previously described in the section entitled "Background of the Invention", an undesirable result of the water flow through the hydroelectric turbine structure 1 is cavitation erosion on the turbine blades 6 and the turbine liner wall 8. That is, the inner surface of the wall of the turbine liner wall 8, in addition to the surfaces of the turbine blades 6, are subject to erosion and pitting, primarily caused by cavitation as previously described herein. For purposes of repairing such surface deterioration, the gates (not shown) of the hydroelectric turbine structure 1 would first be closed. Correspondingly, and if necessary, water remaining within the turbine structure 1 can be removed by pumping or other conventional means.

For purposes of repairing the surface deterioration, and if desired, a temporary floor structure 15 can be constructed across the turbine chamber 17 formed internally of the turbine liner wall 8. During repair operations, the floor structure 15 would remain stationary, notwithstanding rotation of the turbine blades 6 during repair as described in subsequent paragraphs herein.

When the water has been removed from the turbine chamber 17 and environmental conditions are appropriate for repair operations, a repair assembly 16 can be mounted adjacent a terminating end of one of the turbine blades 6 as further illustrated in FIG. 1. The repair assembly 16 is mounted to one of the turbine blades 6 in a manner so that specific repair operations can be undertaken with respect to the turbine liner wall 8 during rotation of the turbine blades 6. For example, the repair assembly 16 can comprise apparatus for undertaking grinding and welding operations during turbine blade rotation. In addition, apparatus for removing surface corrosion and epoxy, such as water blasting apparatus and sanding apparatus, can also be employed. Erosion can be repaired by a process of grinding away the eroded material, and replacing this material with new metal material by a welding operation, utilizing the appropriate components of the repair assembly 16.

Following conditioning of the surfaces of the turbine blades 6 and the liner wall 8, weld material, such as stainless steel or other cavitational resistant alloys, could be applied to the liner wall 8 during rotation of turbine blades 6. After such application, further machining operations could be undertaken to "smooth" the stainless steel buildup on the liner wall 8.

For purposes of utilizing the repair assembly 16 as previously described herein, a means must be provided for achieving a steady and controllable rotation of the turbine shaft 2 and turbine blades 6. Preferably, the rotational speed is variable and may, for example, be in the range of zero to 200 r.p.m. Rotation of the turbine shaft 2 during repair operations can be accomplished with a turbine turning mechanism 18 as generally shown in FIG. 1, and more specifically illustrated in FIGS. 2 and 3. As shown in FIG. 1, the turbine turning mechanism 18 can be mounted adjacent or approximately adjacent an outside edge of one of the turbine blades 6, in relatively close proximity to the turbine liner wall 8.

Figure 2:
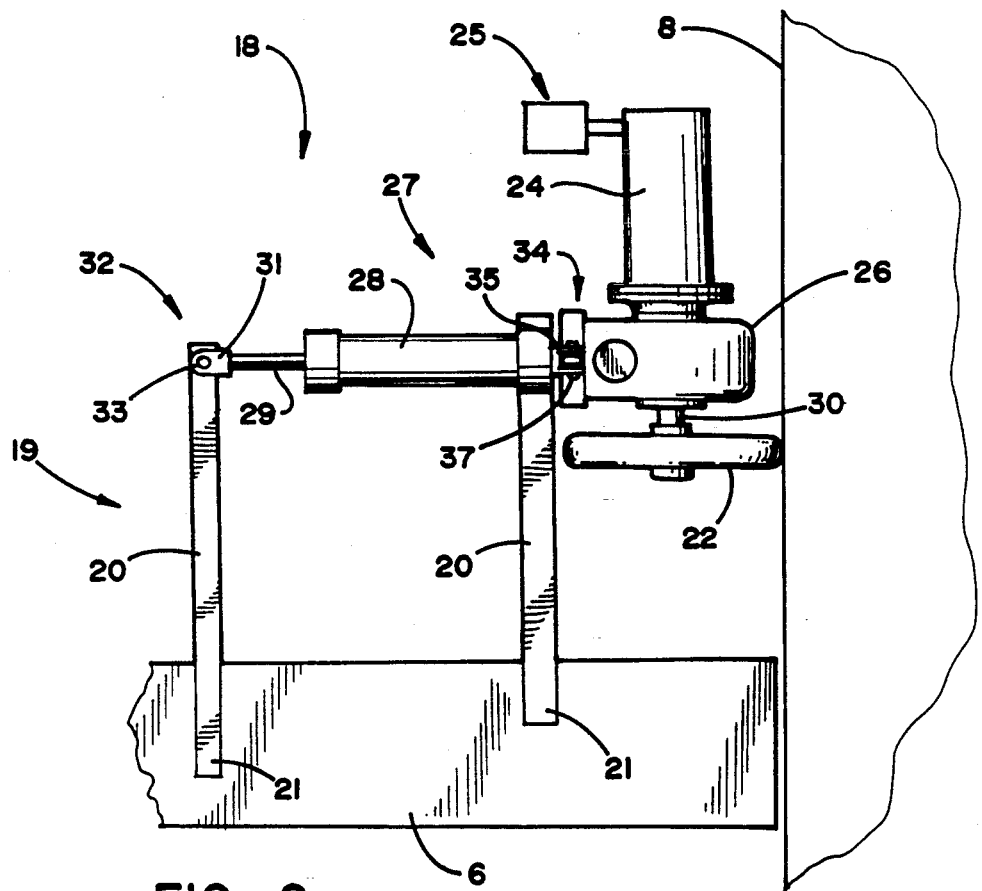
FIG. 2 is a side view of an embodiment of a turbine turning mechanism which can be utilized in combination with repair assemblies in accordance with the invention.
Figure 3:
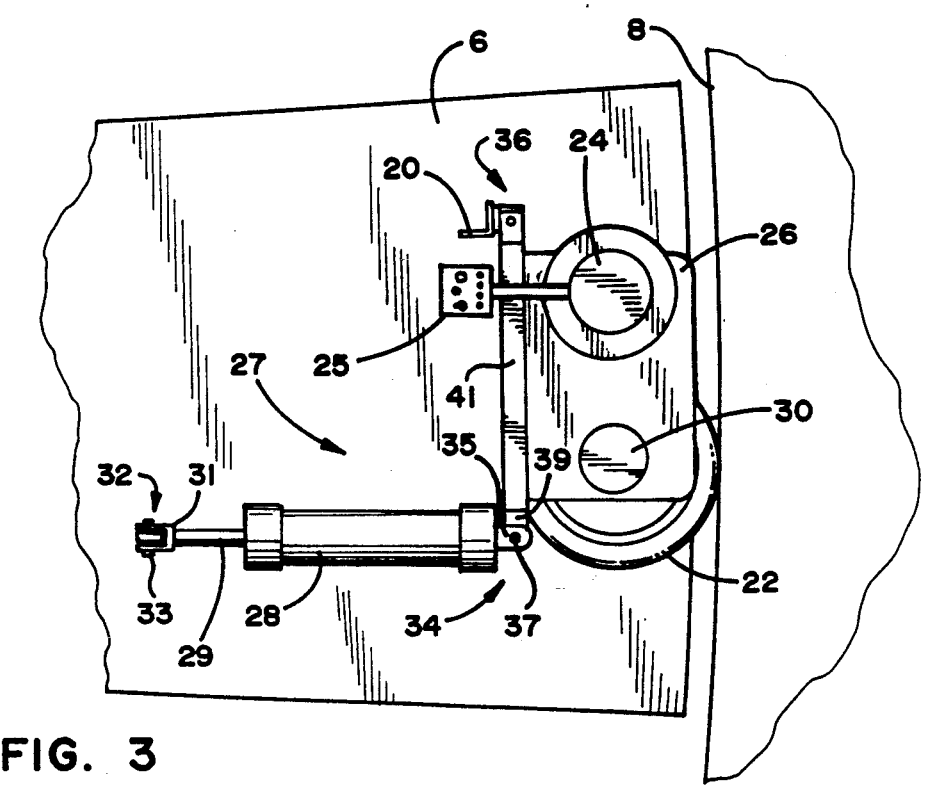
FIG. 3 is a plan view of the turbine turning mechanism as shown in FIG. 2.

Referring to FIGS. 2 and 3, the turbine turning mechanism 18 can comprise a suitable mounting and support assembly 20 for securely attaching components of the turbine turning mechanism 18 to the turbine blades 6. For example, as specifically illustrated in FIG. 2, the turning mechanism 18 can comprise a series of support braces 20 or similar supporting elements secured to a blade 6 by welding or otherwise securing the lower ends 21 of the support braces 20 to the pitched surface of one of the blades 6. The structural configuration of the mounting assembly 19 can be any of a number of supporting structures. The principal requirement of the mounting assembly 19 is to provide a relatively rigid and secure attachment of the turbine turning mechanism 18 to the turbine blade 6.

As illustrated in FIGS. 2 and 3, the turning mechanism 18 further comprises a turning wheel 22 rotatably driven by a conventional motor drive assembly 24. The turning mechanism 18 is supported at a location along the turbine blade 6 so that the turbine turning wheel 22 is in relatively close proximity to the turbine liner wall 8. The turning wheel 22 can be of a conventional annular configuration, and should preferably be constructed of a durable and wear-resistant material. For example, a neoprene material can be employed.

The turning wheel 22 is coupled to a conventional drive shaft 30. In turn, the drive shaft 30 is coupled to the motor drive assembly 24 through a gear reduction mechanism 26. The gear reduction mechanism 26 is conventional in design and comprises a means for reduction of rotational speed of the drive shaft 30 and turning wheel 22, relative to operational speed of the motor drive assembly 24, while correspondingly increasing torque of the shaft 30 and wheel 24.

The turning wheel 22 can be biased (as subsequently described herein,) so as to be selectively urged against the surface of the liner walls 8 with a sufficient frictional force between the wheel 22 and the liner walls 8 such that rotation of the turning wheel 22 relative to the liner walls 8 will result in the frictional forces between the same being translated into rotational forces exerted on the turbine blade 6. Accordingly, rotational operation of turning wheel 22 will cause the turbine blade 6 to which the turning mechanism 18 is attached to rotate and, correspondingly, will further cause rotation of the entirety of the turbine blades 6 and turbine shaft 2. With the positional relationship of the turning mechanism 18 relative to the configuration of the turbine blades 6 and the position of turbine shaft 2, a substantial "mechanical advantage" is created. That is, with the mounting of the turning mechanism 18 adjacent an outermost edge of a turbine blade 6, relatively small drive forces can be exerted by the motor drive assembly 24 on the turning wheel 22 to successfully rotate the relatively massive turbine shaft 2 and turbine blades 6. As an example, for a hydroelectric turbine facility of relatively conventional size, the motor drive assembly 24 can comprise a three-quarter horsepower electric motor.

Although not specifically illustrated in the drawings, the speed of rotation of the turning wheel 22 and, correspondingly, rotation of the turbine blades 6 and turbine shaft 2 can be controlled by a potentiometer 25 secured to and electrically interconnected with the motor drive assembly 24 so as to control motor speed operation. Potentiometer 25 is a conventional electrical unit which is relatively well known and commercially available.

The frictional forces existing between the turning wheel 22 and the liner wall 8 can be controlled in substantial part by a biasing assembly 27. In addition, the biasing assembly 27 can be employed to control the engagement or total disengagement of the turning wheel 22 bearing against the liner walls 8. As illustrated, the biasing assembly 27 comprises a conventional pneumatic compressed air piston mechanism 28. The piston mechanism 28 is mounted relatively horizontally in relationship to the configuration of the turbine structure 1. The piston mechanism 28 includes a conventional pneumatic cylinder having an axially moveable cylinder rod 29 extending inwardly toward the turbine shaft 2 relative to the liner wall 8. The distal end of the cylinder rod 29 is pivotably coupled to one of the support braces 20 through a pivot assembly 32. The pivot assembly 32 comprises a conventional yoke 31 having a pivot pin 33 extending through apertures in the legs of the yoke 31. The pivot pin 33 also extends through an aperture adjacent the upper end of the pivotably coupled support brace 20 in a manner so that the support brace 20 is engaged intermediate the legs of the yoke 31. With the yoke 31 having the configuration as illustrated in FIGS. 2 and 3, the cylinder rod 29 and piston mechanism 28 can pivot in a "pitch" direction relative to a horizontal plane extending through the piston rod 29.

Correspondingly, secured to the other end of the piston mechanism 28 opposing the end from which the cylinder rod 29 extends is a further yoke 35 which is rotated 90° relative to the spatial configuration of yoke 31. Extending through apertures in the legs of yoke 35 is a pivot pin 37 having a vertically disposed configuration. The yoke 35 and pivot pin 37 capture a bracket 39 located at one end of a mounting spar 41 extending in a horizontal plane along the inner edge of the gear reduction mechanism 26. The yoke 35, pivot pin 37 and spar bracket 39 can be characterized as a pivot means 34 for providing a further pivot of the biasing assembly 27. This arrangement allows for pivoting movement of the mounting spar 41 and associated gear reduction assembly 26 and turning wheel 22 in a horizontal plane relative to the biasing assembly 27.

In addition to the pivot assembly 32 and pivot means 34, a further pivot assembly 36 is associated with the other end of the mounting spar 41 as illustrated in FIG. 3. The pivot assembly 36 comprises substantially the same components as previously described with respect to the pivot assemblies 32 and 34. The pivot assembly 36 allows pivoting movement of the mounting spar 41, and associated gear reduction assembly 26 and turning wheel 22, relative to the support brace 20 to which the mounting spar 41 is pivotably coupled through pivot assembly 36.

Although not specifically shown in the drawings, the extension or retraction of the cylinder rod 29 relative to the piston mechanism 28 can be controlled through any suitable pneumatic or electromechanical control assembly which is relatively well known and commercially available with conventional piston mechanisms 28. As the piston rod 29 is extended, the piston mechanism 28 will move towards the liner wall 8, thereby exerting increasing forces of the turning wheel 22 against the liner wall 8. In part, this increase in forces will also cause the area of contact between the surface of liner wall 8 and the periphery of turning wheel 22 to correspondingly increase. The greater the forces exerted by extension of the cylinder rod 29, the greater the frictional forces will be exerted between the turning wheel 22 and the surface of liner wall 8. The exact position of cylinder rod 29 for use of the turning wheel 22 to rotate the turbine blades 6 and turbine shaft 2 relative to the surface of liner wall 8 will be dependent upon the specific structural configuration utilized for the turbine turning mechanism 18, materials from which the turning wheel 22 is constructed and various other parameters. The forces exerted by the turning wheel 22 against the surface of liner wall 8 should be sufficient s that rotation of turning wheel 22 through use of the motor drive assembly 24 and gear reduction mechanism 26 will cause the turning wheel 22 to essentially "roll" across the surface of liner wall 8, without any substantial slippage.

When it is desired to cease rotation of the turbine blades 6 and turbine shaft 2 by operation of turning wheel 22 against the surface of liner wall 8, the piston mechanism 28 and cylinder rod 29 can be controlled in any suitable manner so as to retract the cylinder rod 29 into the piston mechanism 28. This retraction will correspondingly cause the turning wheel 22 to be moved away from the surface of liner wall 8 so that there is no contact remaining therebetween.

In accordance with the foregoing, the rotation of the turbine blades 6 and turbine shaft 2 by operation of the turning wheel 22 against the liner wall 8 provides a requisite "steady" rotational movement for purposes of undertaking repairs of the liner wall 8 as previously described herein. Further, with the particular positioning of the turning mechanism 18 adjacent a distal end of one of the turbine blades 6, the mechanical advantage provided by this positioning is substantial. Accordingly, a relatively small motor drive assembly 24 can be employed for providing the requisite rotation of the turbine blades 6, notwithstanding the massive size of conventional turbine blades 6 and turbine shaft 2. Exerting forces between the turbine turning mechanism 18 and the liner wall 8 in a manner as described herein, for purposes of causes rotation of the turbine blades 6, provides a substantial advantage over other arrangements whereby the turbine blades 6 are rotated through externally generated forces which must be translated through the turbine shaft 2. Such other arrangements require substantially more energy and will tend to cause a relatively "jerky" rotational movement of the turbine blades 6.

As earlier described, when the water has been removed from the turbine chamber 17, and environmental conditions are appropriate for repair operations, a repair assembly 16 can be mounted to the turbine blades 6. The repair assembly 16 is mounted so that specific repair operations can be undertaken with respect to the turbine liner wall 8 during rotation of the turbine blades 6. The principles of a repair assembly 16 in accordance with the invention will now be described with respect to FIGS. 4-28.

Figure 4:
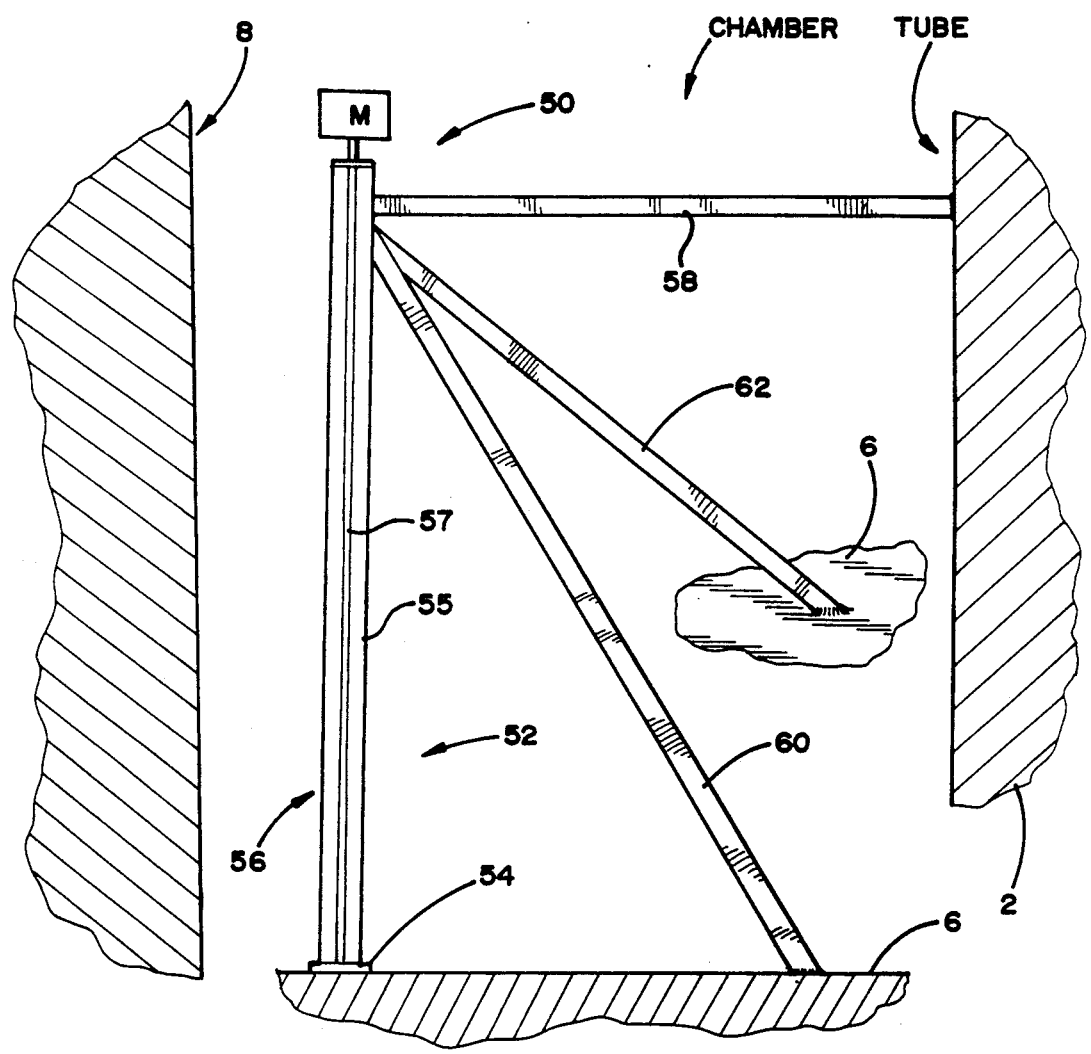
FIG. 4 is a view of an exemplary support structure for a hydraulic turbine repair assembly in accordance with the invention.

Turning to FIG. 4, the repair assembly 16 comprises a support structure 50 which is adapted to mount specific repair apparatus in a manner so that the apparatus can be selectively moved toward and away from the liner wall 8. The support structure 50 includes a vertical adjusting slide 52 suitably mounted in a vertical configuration to one of the turbine blades 6. For example, the vertical adjusting slide 52 can be mounted in any suitable manner to a base plate 54 which, in turn, is temporarily secured to the surface of one of the turbine blades 6. The base plate 54 can be secured to the one of the turbine blades 6 by any suitable means, such as spot welding or the like.

For purposes of providing relatively rigid support of the vertical adjusting slide 52, the adjusting slide includes a support frame 56 having a pair of side walls 55 surrounding a subsequently described adjusting screw 64 on two sides thereof. A pair of support flanges 57 extend laterally outward from and are integral with or otherwise connected to the side walls 55. Connected in any suitable manner to the side walls 55 is a series of three support spars 58, 60 and 62. The support spars 58, 60 and 62 can comprise elongated cylinders or the like made of any suitable rigid material and having sufficient strength so as to maintain the vertical adjusting slide 52 in an appropriate vertical orientation. One of the support spars 58 can be interconnected between the frame 5 of the vertical adjusting slide 52 and the hub 2 of the hydraulic turbine. Correspondingly, another one of the support spars 60 can be interconnected between the frame 56 and the one of the turbine blades 6 to which is mounted the adjusting slide 52 through the base plate 54. Still further, the other of the support spars 62 can be interconnected between the frame 56 and an adjacent one of the turbine blades 6 (only a portion of the adjacent turbine blade 6 being illustrated in FIG. 4). With the support spars 60 and 62 connected to the adjacent turbine blades 6 in a manner so that the spars 60 and 62 are angled downwardly from an upper portion of the vertical adjusting slide 52 toward the turbine blades 6, the support structure 50 can maintain a relatively rigid orientation of the vertical adjusting slide 52. It should be emphasized that the particular orientation of the support spars 58, 60 and 62, and the use of the support spars does not provide any of the primary concepts of the invention. That is, other means can be employed for suitably maintaining the vertical adjusting slide 52 in a relatively rigid vertical orientation.

Figure 5:
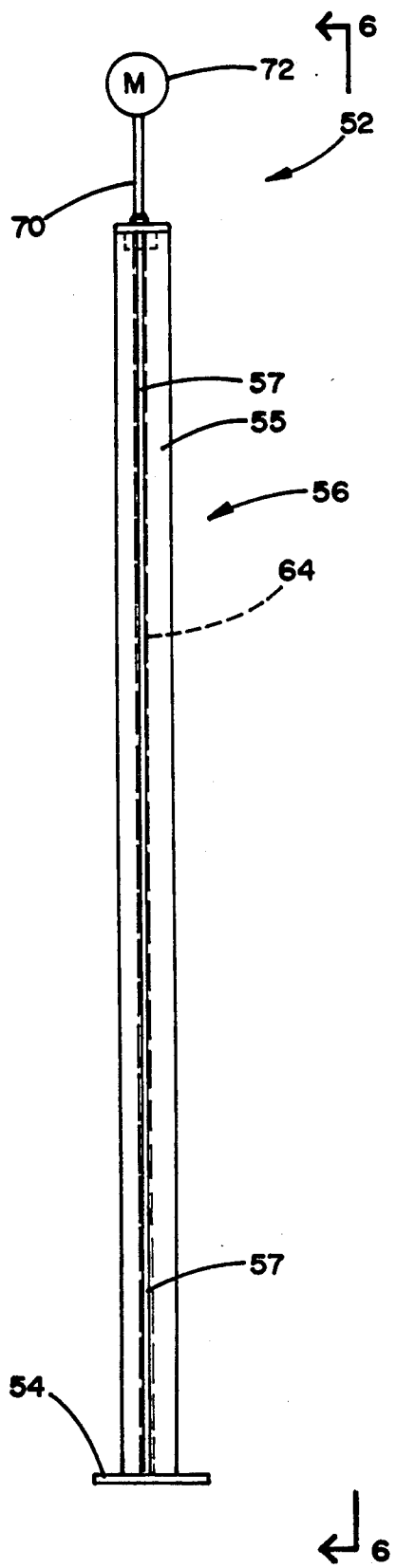
FIG. 5 is a side view of the vertical adjusting slide of the support structure shown in FIG. 4.
Figure 6:
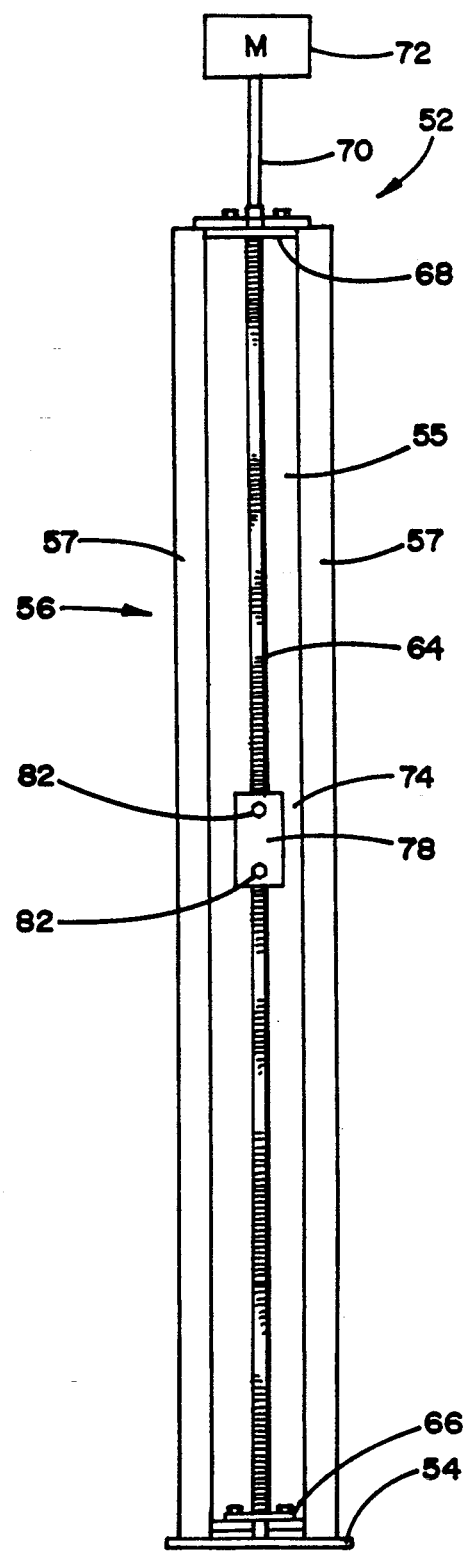
FIG. 6 is a front elevation view of the vertical adjusting slide of the support structure shown in FIG. 5, taken along lines 6—6 of FIG. 5.

Turning to FIGS. 5 and 6, in addition to FIG. 4, the vertical adjusting slide 52, as previously described, includes a frame 56 and is interconnected in any suitable manner to a lower base plate 54. The frame 56 partially encloses an elongated vertical adjusting screw 64. As illustrated primarily in FIG. 6, the vertical adjusting screw 64 is rotatably secured at its lower portion to a relatively conventional bearing assembly 66. The lower bearing assembly 66 provides vertical and horizontal support for the adjusting screw 64, while allowing for rotation of the screw 64. Correspondingly, the threaded vertical adjusting screw 64 is interconnected at its top portion to an upper bearing assembly 68. The upper bearing assembly 68 provides support for the adjusting screw 64 at the upper portion thereof, while also allowing for free rotation of the screw 64.

As further shown in FIGS. 5 and 6, the upper portion of the vertical adjusting screw 64 includes a drive shaft 70 extending upwardly through the outer housing 56. The drive shaft 70 is rotatably interconnected with a conventional motor 72 which is operable to selectively rotate the vertical adjusting screw 64. The motor 72 can be any of numerous types of reversible motors suitably adapted for selective operation so as to rotate the vertical adjusting screw 64 in either of the two angular rotational directions.

Although FIGS. 5 and 6 depict the use of the motor 72 for purposes of driving the threaded vertical adjusting screw 64, it should be emphasized that the motor 72 or other similar automated driving means are not a necessity for operation in accordance with the invention. For example, the vertical adjusting screw 64 can include at its upper end a nut or similar element for purposes of facilitating manual rotation of the vertical adjusting screw 64 through use of a wrench or similar tool. Of course, other means can also be employed for purposes of exerting forces on the vertical adjusting screw 64 so as to provide rotational movement thereof.

Figure 7:
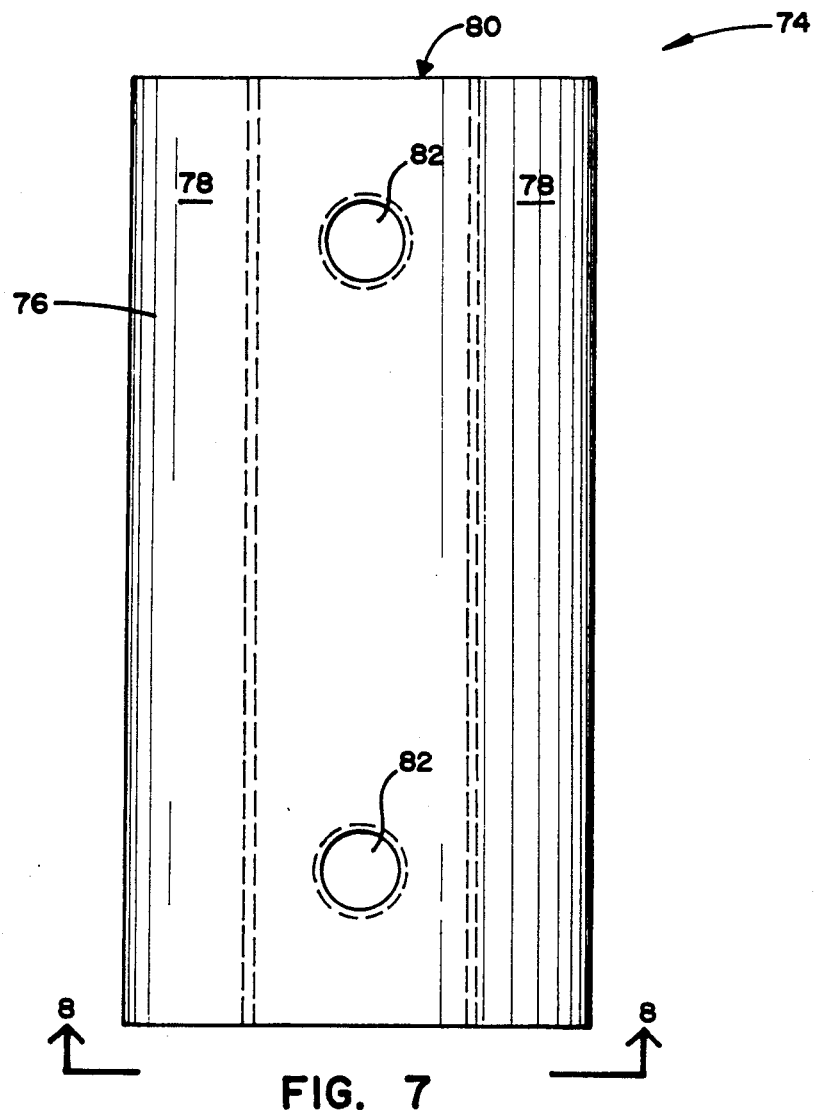
FIG. 7 is a detailed side elevation view of the slide block normally threadably engaged with the screw of the vertical adjusting slide shown in FIGS. 5 and 6.
Figure 8:
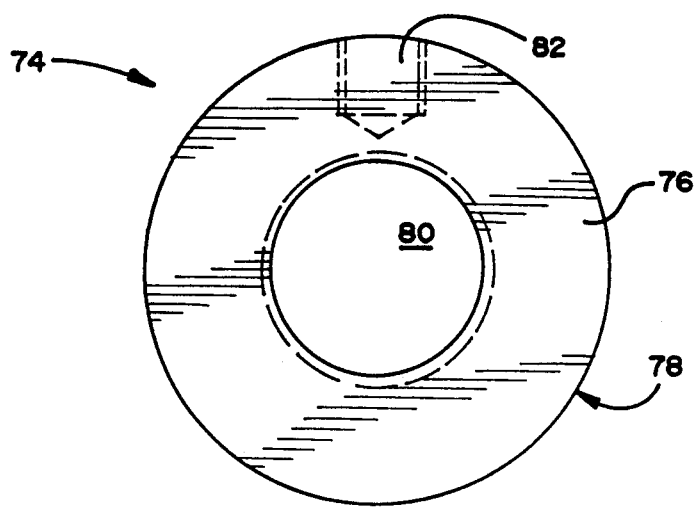
FIG. 8 is an end view of the slide block shown in FIG. 7, taken along lines 8—8 of FIG. 7.

As further depicted in FIG. 6, the vertical adjusting slide 52 includes a slide block 74 adapted to be threadably engaged on the vertical adjusting screw 64. Referring to FIGS. 6, 7 and 8, the slide block 74 comprises a substantially solid structure 76 having an annular cross-sectional configuration (as shown in FIG. 8) with an outer cylindrical surface 78. Extending axially through the central portion of the structure 76 is a threaded aperture 80. The slide block 74 is received on the vertical adjusting screw 64 by threading the threaded adjusting screw 64 through the threaded aperture 80. For purposes of mounting additional elements as described in subsequent paragraphs herein, the slide block 74 also includes a pair of tapped holes 82 extending through the outer surface 78 and partially through the structure 76 of the slide block 74. The holes 82 are internally threaded and are adapted to receive connecting elements for purposes of interconnecting additional portions of the repair assembly 16 to the slide block 74 as described in subsequent paragraphs herein.

Figure 9:
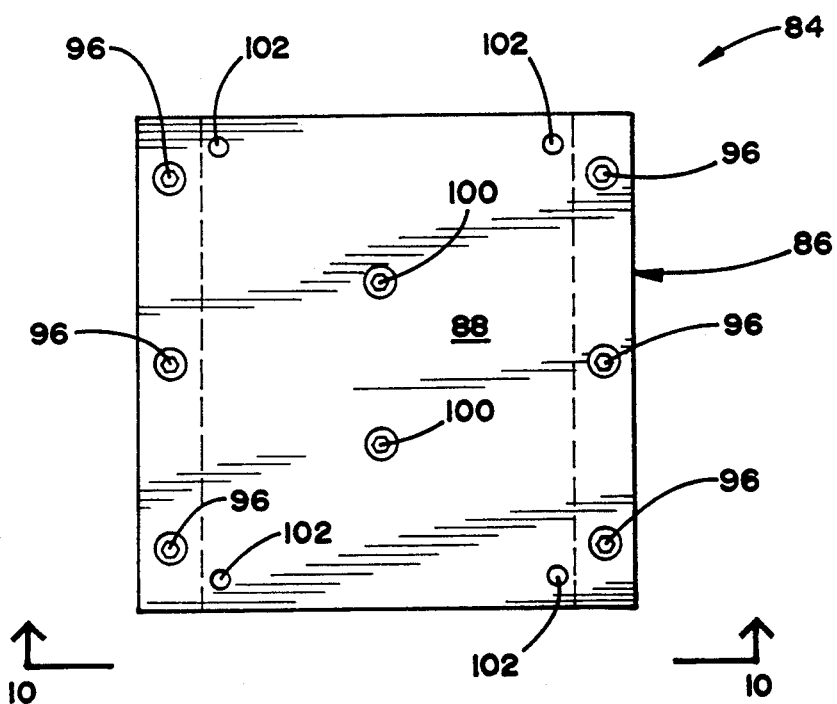
FIG. 9 is a plan view of a vertical slide plate adapted to be secured to the slide block shown in FIGS. 7 and 8.
Figure 10:
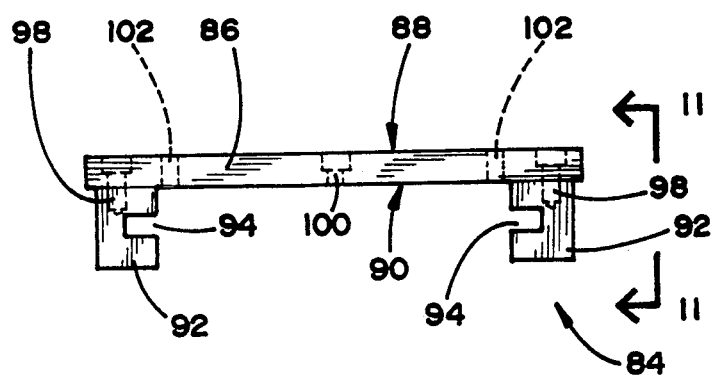
FIG. 10 is an end view of the vertical slide plate shown in FIG. 9, taken along lines 10—10 of FIG. 9.
Figure 11:
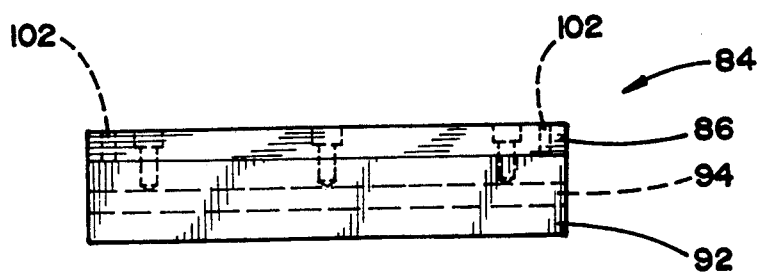
FIG. 11 is a side view of the vertical slide plate shown in FIGS. 9 and 10, taken along lines 11—11 of FIG. 10.

The slide block 74 is adapted to be interconnected with a vertical slide plate 84 as depicted in FIGS. 9, 10 and 11. Referring specifically thereto, the vertical slide plate 84 includes a substantially flat and rectangular section 86 having an upper surface 88 and a lower surface 90.

The vertical slide plate also includes a pair of C-shaped brackets or slide bars 92, each having an elongated configuration as illustrated in FIGS. 10 and 11. In addition, each C-shaped bracket 92 includes an inwardly directed channel 94 and is positioned so as to be integral with or interconnected to the lower surface 90 of the rectangular section 86. Further, each of the C-shaped brackets 92 is located along opposing sides of the lower surface 90 of the rectangular section 86, so that the channels 94 are in an opposing relationship as illustrated in FIG. 10. As primarily illustrated in FIG. 9, a series of three counter-sunk bores 96 are located on opposing sides of the rectangular section 86, and mate with threaded apertures 98 extending through the upper surfaces of the C-shaped brackets 92. The counter-sunk bores 96 and threaded apertures 98 form appropriate threaded apertures for receiving counter-sunk screws or the like for purposes of interconnecting the C-shaped brackets 92 to the rectangular section 86.

In addition to the counter-sunk bores 96, the rectangular section 86 also includes a pair of additional counter-sunk bores 100 extending through the central portion of the rectangular section 86 as illustrated in FIGS. 9 and 10. In accordance with the invention, the vertical slide plate 84 is adapted to be interconnected to the previously described slide block 74 (FIGS. 7 and 8) through the mating of the counter-sunk bores 100 to the holes 82 within the slide block 74. Appropriate counter-sunk screws or the like can then be utilized to securely attach the vertical slide plate 84 to the slide block 74. When the slide block 74 is connected to the slide plate 84, the channels 94, formed by the C-shaped brackets 92, receive the two support flanges 57 of the adjusting slide 52. In this manner, the slide plate 74 is secured to the adjusting slide 52 in a manner which allows for vertical movement of the slide plate along the length of the vertical adjusting slide 52.

As also shown in FIGS. 9 and 10, the rectangular section 86 includes a series of four apertures 102 which are positioned adjacent the four corners of the rectangular section 86. As will be described in subsequent paragraphs herein, the apertures 102 are adapted to receive connecting means (such as screws or the like) for purposes of mounting the vertical slide plate 84 to other elements of the repair assembly 16 as described in subsequent paragraphs herein.

In accordance with the invention, the repair assembly 16, in addition to the support structure 50 and other elements described herein, also includes specific repair assemblies adapted for performing various repair operations relating to the liner wall 8 and other components of the hydraulic turbine 1. Included within these specific functional repair mechanisms is a grinder mechanism 104 as primarily illustrated in FIGS. 12 and 13. In brief summary, the grinder mechanism 104 is adapted to contact the liner wall 8 for purposes of machine grinding and removing material from the liner wall. In this regard, the grinder mechanism 104 is adapted to provide a grinding and material removal function at a particular horizontal plane along the entire inner perimeter of the liner wall 8 at such plane. Thereafter, in accordance with the other aspects of the invention as described and claimed herein, the grinder mechanism 104 is adapted to be moved vertically to a different horizontal plane, and the grinding operation repeated with respect to the inner perimeter of the liner wall 8 at such different horizontal plane. For purposes of providing a grinding operation around the entire inner perimeter of the liner wall 8, the turbine turning mechanism previously described herein can be employed for purposes of traversing the liner wall inner perimeter.

Figure 12:
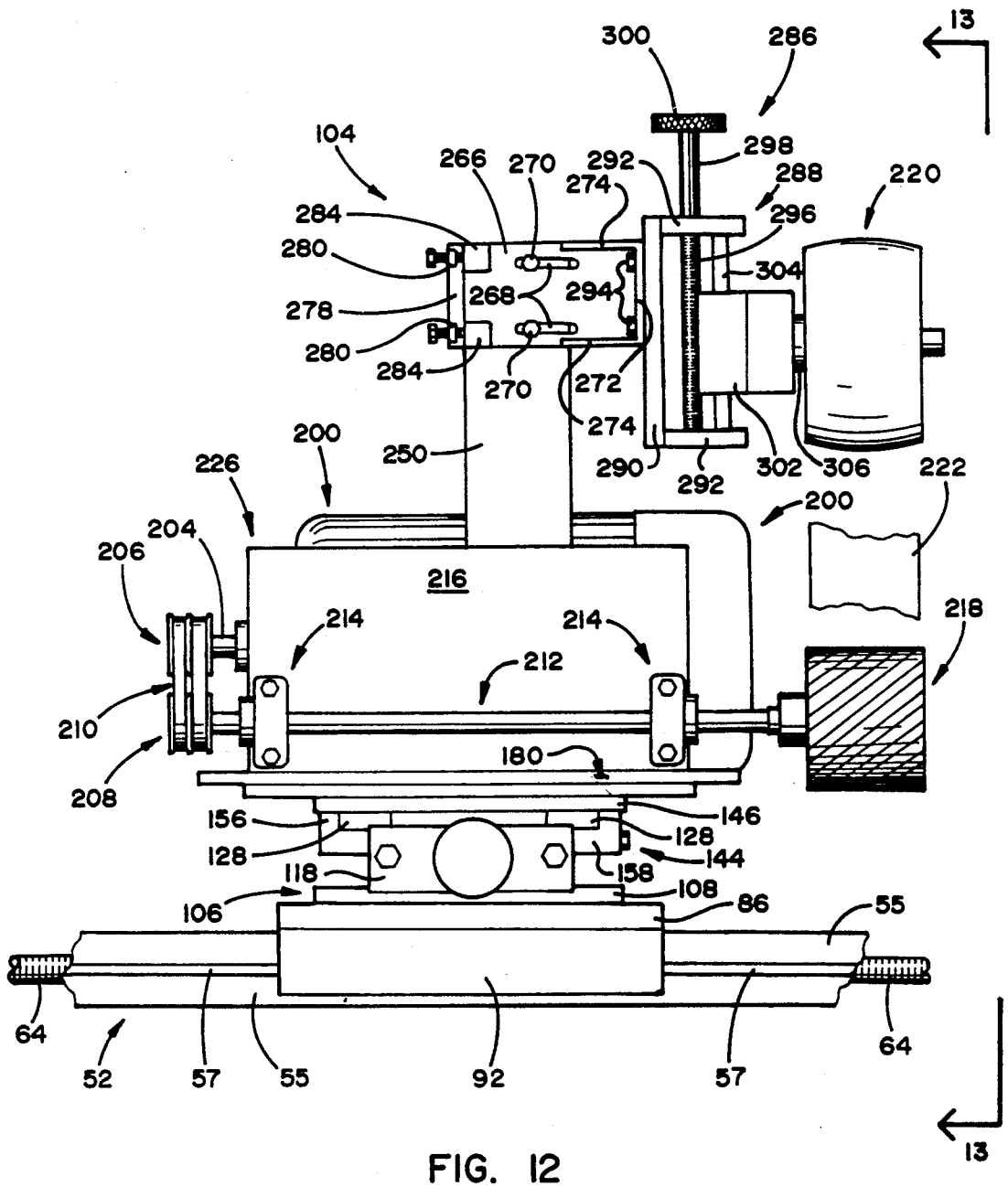
FIG. 12 is an end elevation view of an exemplary grinder mechanism in accordance with the invention.
Figure 13:
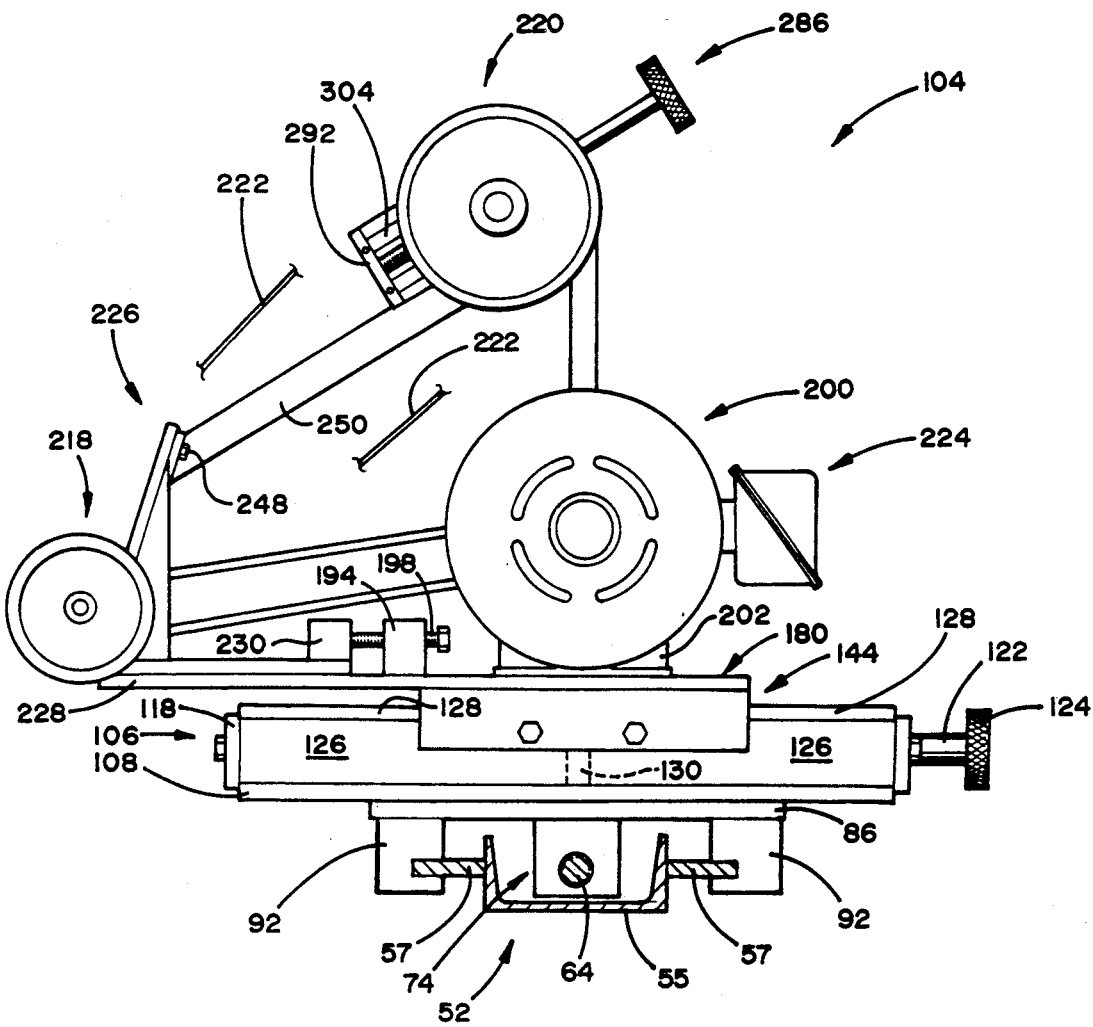
FIG. 13 is a side elevation view of the grinder mechanism shown in FIG. 12, taken along lines 13—13 of FIG. 12.

Turning specifically to FIGS. 12 and 13, the grinder mechanism 104 includes, at the lower portion thereof, a motor adjusting slide assembly 106. The motor adjusting slide assembly 106 is illustrated in greater detail in FIGS. 14, 15 and 16. Referring thereto, in addition to FIGS. 12 and 13, the motor adjusting slide assembly 106 includes a base connecting plate 108 having a substantially rectangular configuration (as primarily shown in FIG. 15), with the base connecting plate 108 having a series of apertures 110 extending through the upper surface 112 and lower surface 114 of the connecting plate 108. The apertures 110 are positioned so that there is a equal number of apertures 110 on each of the two opposing lateral sides of the base connecting plate 108. The apertures 110 are spaced apart in a manner so that four of the apertures 110 (two on each side of the connecting plate 108) can be aligned with the apertures 102 of the vertical slide plate 84. Connecting nuts and bolts, or similar connecting means, can then be received through the apertures 102 of vertical slide plate 84 and through the apertures 110 of the base connecting plate 108 for purposes of securing the motor adjusting slide assembly 106 to the vertical slide plate 84. By providing a number of apertures 110, the relative positioning of the motor adjusting slide assembly 106 relative to the vertical slide plate 84 can be adjusted, for purposes of adjusting the distance between certain components of the grinder mechanism 104 and the liner wall 8 as described in subsequent paragraphs herein. In this manner, the motor adjusting slide assembly 106 can be interconnected to the vertical adjusting slide 52 in a manner so that the slide assembly 106 and associated components subsequently described herein can be adjusted in vertical height along the length of the vertical adjusting screw 64.

In addition to the base connecting plate 108, the motor adjusting slide assembly 106 includes a threaded motor adjusting screw 116 extending longitudinally along the length of the motor adjusting slide assembly 106. The threaded motor adjusting screw 116 is rotatably supported at its distal end by a bearing assembly 118. The distal end bearing assembly 118 provides a substantial rigid support for preventing the adjusting screw 116 from any substantial lateral movement, while allowing for substantially free rotation of the adjusting screw 116. Correspondingly, at the other end of the threaded motor adjusting screw 116, the screw 116 is rotatably supported by a forward end bearing assembly 120. Like the distal end bearing assembly 118, the forward end bearing assembly 120 prevents the adjusting screw 116 from any substantial lateral movement, while correspondingly allowing for substantially free rotation of the screw 116.

At the forward end of the adjusting screw 116, the screw 116 includes a connecting shaft 122 integral with or otherwise axially connected in any suitable manner to the threaded portion of the adjusting screw 116. At the outer portion of the connecting shaft 122, a knurled adjustment handle 124 is provided. The knurled adjustment handle 124 allows for manual rotation of the threaded motor adjusting screw 116.

Figure 16:
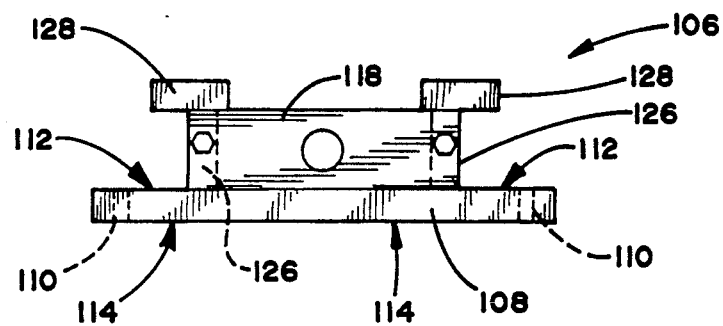
FIG. 16 is an end view of the motor adjusting slide shown in FIGS. 14 and 15, taken along lines 16-16 of FIG. 15.

As illustrated primarily in FIGS. 14 and 16, the motor adjusting slide assembly 106 also includes a pair of vertically disposed and parallel upright support members 126 integral with or otherwise connected to the upper surface 112 of the base connecting plate 106. The upright support members 126 are located on opposing sides of the motor adjusting screw 116 and extend longitudinally along the length of the slide assembly 106 in a parallel configuration to the axis of the adjusting screw 116. Located atop the upright support members 126, and integral with or otherwise connected thereto are a pair of support ledges 128 extending along the longitudinal length of the slide assembly 106. As shown primarily in FIG. 16, the support ledges 128 are horizontally disposed and extend outwardly relative to the upright support members 126.

Figure 17:
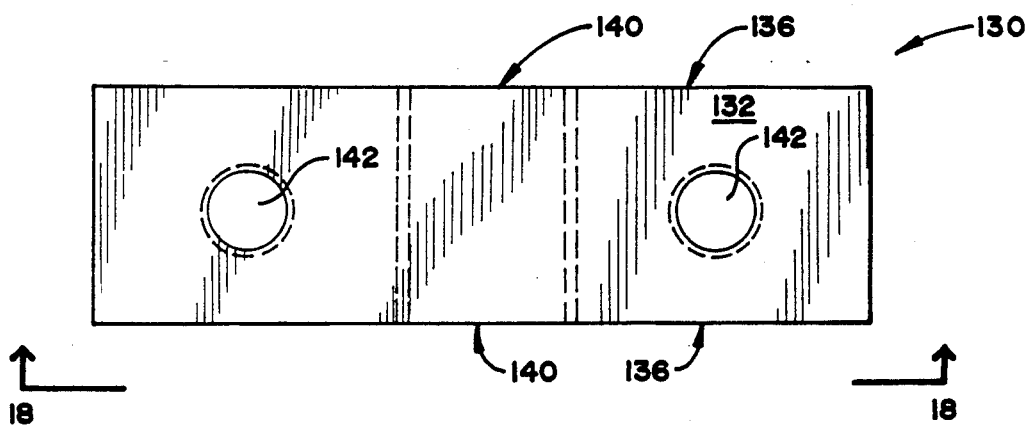
FIG. 17 is a plan view of the slide block of the motor adjusting slide.
Figure 18:
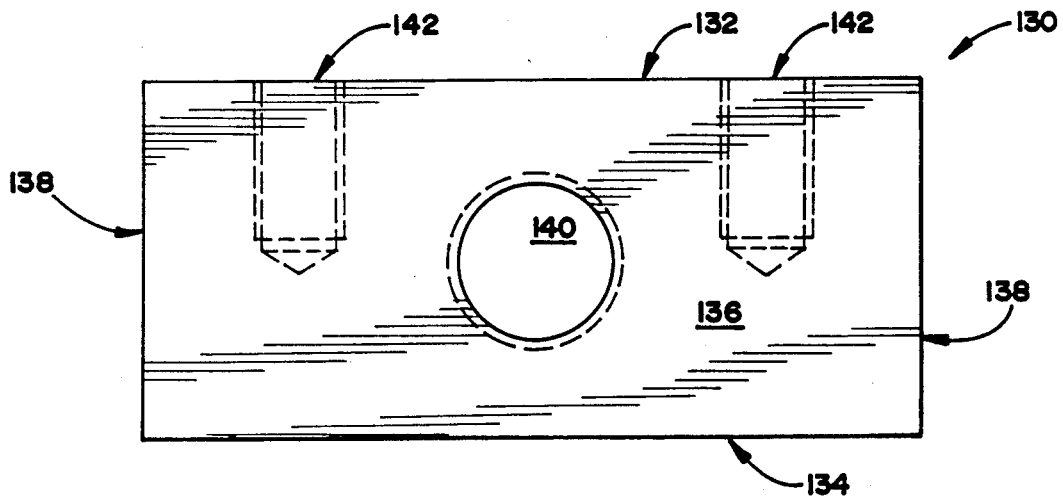
FIG. 18 is an end view of the slide block of the motor adjusting slide, taken along lines 18—18 of FIG. 17.

As shown primarily in FIGS. 14 and 15, the motor adjusting slide assembly 106 also includes a motor adjusting slide assembly slide block 130. Details of the motor adjusting slide assembly slide block 130 are shown in FIGS. 17 and 18. Referring primarily to FIGS. 17 and 18, the motor adjusting slide assembly slide block 130 comprises a substantially rectangular and solid housing having an upper surface 132, a lower surface 134, two opposing side surfaces 136, and further opposing side surfaces 138. Extending through the slide block 130 and the opposing side surfaces 136 is a threaded aperture having a diameter substantially corresponding to the diameter of the motor adjusting screw 116. As shown primarily in FIGS. 14 and 15, the slide block 130 is adapted to be adjustably received on the adjusting screw 116 by means of threadably engaging the adjusting screw 116 through the threaded aperture 140 of slide block 130. As further illustrated in FIGS. 17 and 18, the slide block 130 includes a pair of threaded bores 142 extending through the upper surface 132 and extending partially through the solid portion of the slide block 130 as illustrated in FIG. 18. The threaded apertures 142 are adapted to receive connecting means for connecting additional components of the grinder mechanism 104 as described in subsequent paragraphs herein. In accordance with the foregoing, and as earlier described, the motor adjusting slide assembly 106 is adapted to be rigidly secured to the vertical slide plate 84 through connecting elements (such as screws or bolts) extending through the apertures 110 of the base connecting plate 108 and through the apertures 102 extending through the rectangular section 86 of the slide plate 84.

Figure 19:
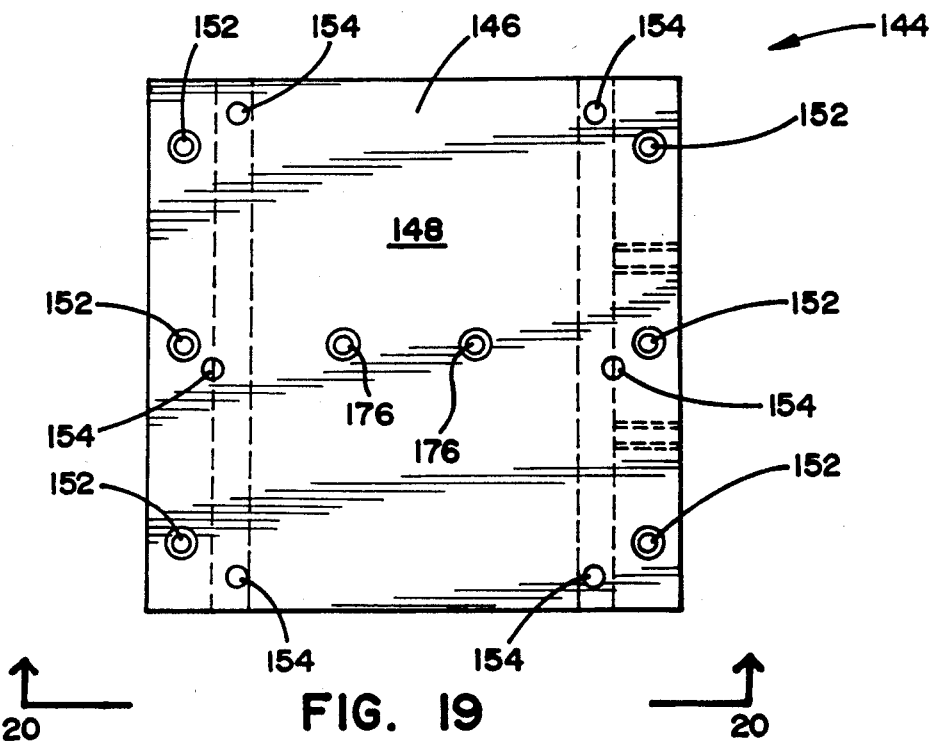
FIG. 19 is a plan view of the motor slide plate.
Figure 20:
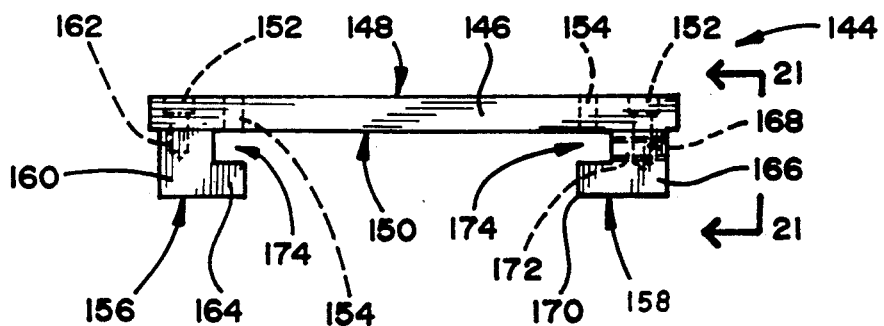
FIG. 20 is an elevation view of the motor slide plate shown in FIG. 19, taken along lines 20—20 of FIG. 19.
Figure 21:
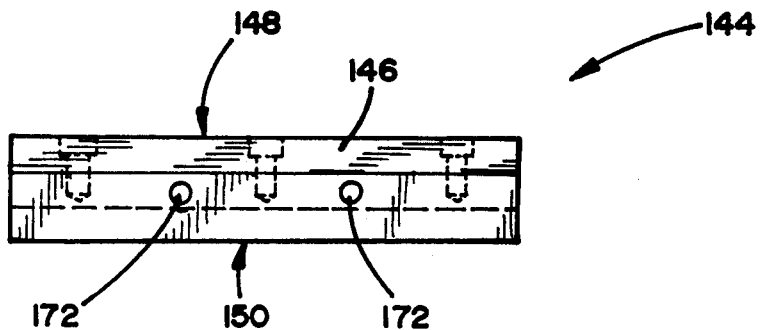
FIG. 21 is an end view of the motor slide plate shown in FIGS. 19 and 20, taken along lines 21—21 of FIG. 20.

The motor adjusting slide assembly 106 is adjustably mounted to a motor slide plate 144 shown in the overall drawings of the grinder mechanism 104 in FIGS. 12 and 13. Details of the motor slide plate 144 are shown in FIGS. 19, 20 and 21. Referring thereto, the motor slide plate 144 includes a rectangular base section 146 having an upper planer surface 148 and a lower planer surface 150. Extending through the upper and lower planer surfaces 148, 150 are a series of six counter-sunk apertures 152 as primarily shown in FIG. 19. The counter-sunk apertures 152 are positioned so that there are three apertures 152 on each of the two opposing lateral sides of the rectangular base section 146. As also shown primarily in FIGS. 19 and 20, the rectangular base section 146 further includes a series of six bores extending completely through the base section and through the upper and lower planer surfaces 148, 150, respectively.

The motor slide plate 144 further includes a pair of slide bars primarily shown in FIG. 20 and designated as the left slide bar 156 and the right slide bar 158. The left slide bar 156 includes a base section 160 having a threaded aperture 162 partially extending therethrough from the upper surface of the section 160. In addition, the right slide bar 158 also includes a ledge portion 164 integral with the base section 160 and extending inwardly as primarily illustrated in FIG. 20. The three threaded apertures 162 are adapted to mate with the counter-sunk apertures 152 on one side of the rectangular base section 146, and counter-sunk screws or the like are threadably engaged therethrough so as to secure the left slide bar 156 to one side of the rectangular base section 146 in an abutting relationship with the lower planer surface 150.

As further illustrated primarily in FIG. 20, the right slide bar 158 has a configuration substantially conforming to the configuration of the left slide bar 156. That is, the right slide bar 158 also includes a base section 166 having a series of three threaded apertures 168 extending therethrough. In addition, the right slide bar 158 also includes a ledge portion 170 positioned so as to be directed inwardly as illustrated in FIG. 20, and integral with the base section 166. The right slide bar 158 can also include a series of two threaded apertures 172 extending laterally through the right slide bar 158, and particularly through the base section 166. The right slide bar 158 can be positioned so that the threaded apertures 168 mate with three of the threaded apertures 152 on a side of the rectangular base section 146 opposing the side to which the left slide bar 156 is connected. Counter-sunk screws or the like can be inserted through the threaded apertures 152 and the threaded apertures 168 so as to rigidly secure the right slide bar 158 to the rectangular base section 146 in an abutting relationship with the lower planer surface 150.

With the configuration of the motor slide plate 144 as described herein, the rectangular base section 146, left slide bar 156 and right slide bar 158 form a pair of channels 174 as illustrated in FIG. 20. The channels 174 are adapted to receive the ledges 128 of the motor adjusting slide assembly 106 illustrated in FIGS. 14, 15 and 16. Correspondingly, the rectangular base section 146 includes an additional pair of counter-sunk apertures 176 extending through the central portion of the section 146 as primarily illustrated in FIG. 19. The apertures 176 are adapted to mate with the threaded apertures 142 of the motor adjusting assembly slide block 130, and receive counter-sunk screws or the like for purposes of securing the motor slide plate 144 to the slide block 130.

In accordance with the foregoing, the motor slide plate 144 can be adjusted along the longitudinal length of the slide assembly 106. That is, the motor slide plate 144 includes channels 174 which engage the ledges 128 of the slide assembly 106. The slide plate 144 is also rigidly secured to the slide block 130 of the slide assembly 106. With this configuration, by rotation of the adjusting screw 116, the slide block 130 can be made to move axially along the length of the adjusting screw 116. With this movement of the slide block 130 along the axis of the screw 116, the slide plate 144, being rigidly secured to the slide block 130, will be made to follow the movement of the slide block 130, thereby adjusting the position of the slide plate 144

Figure 22:
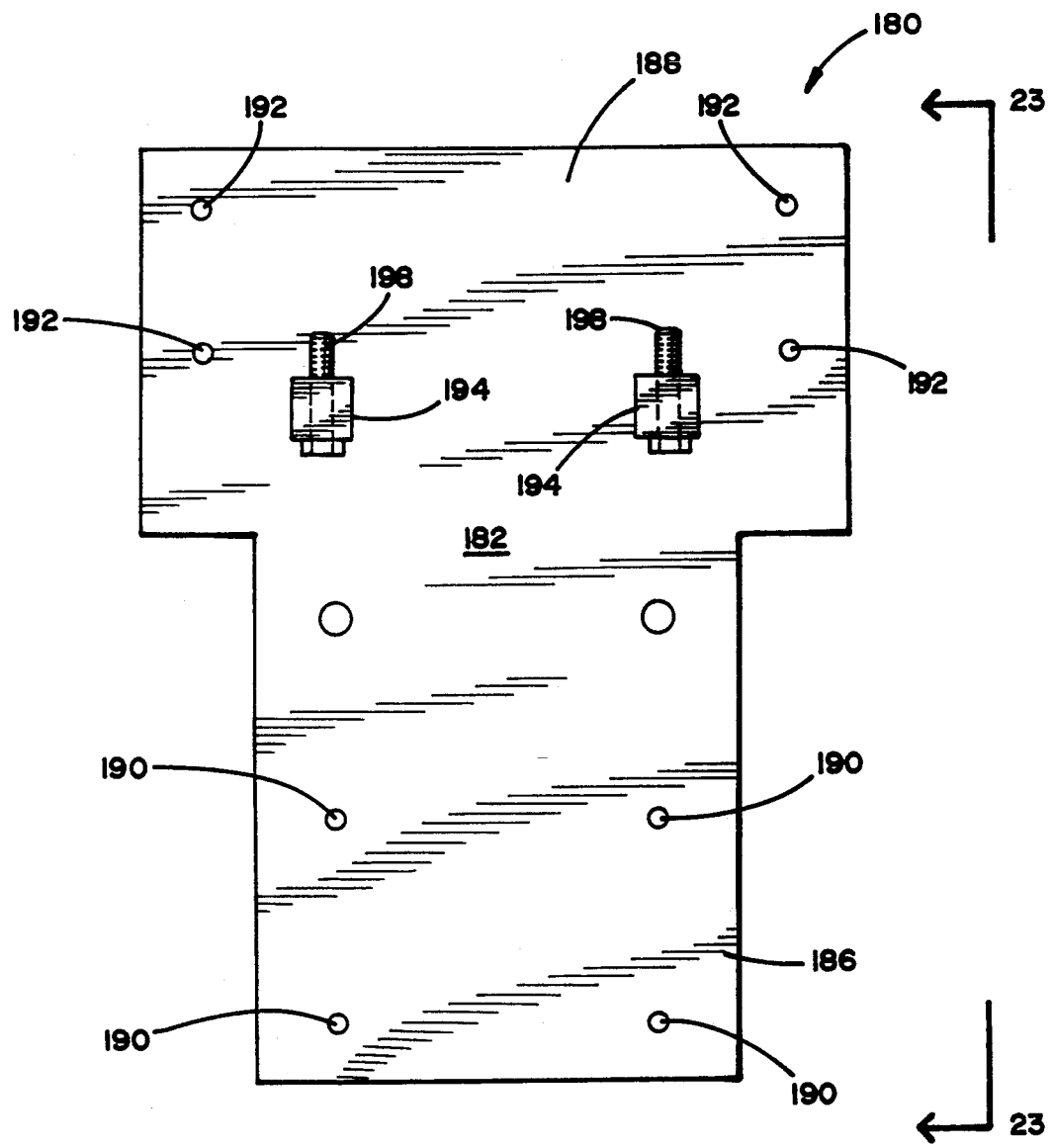
FIG. 22 is a plan, view of the motor base plate of the grinder mechanism.
Figure 23:
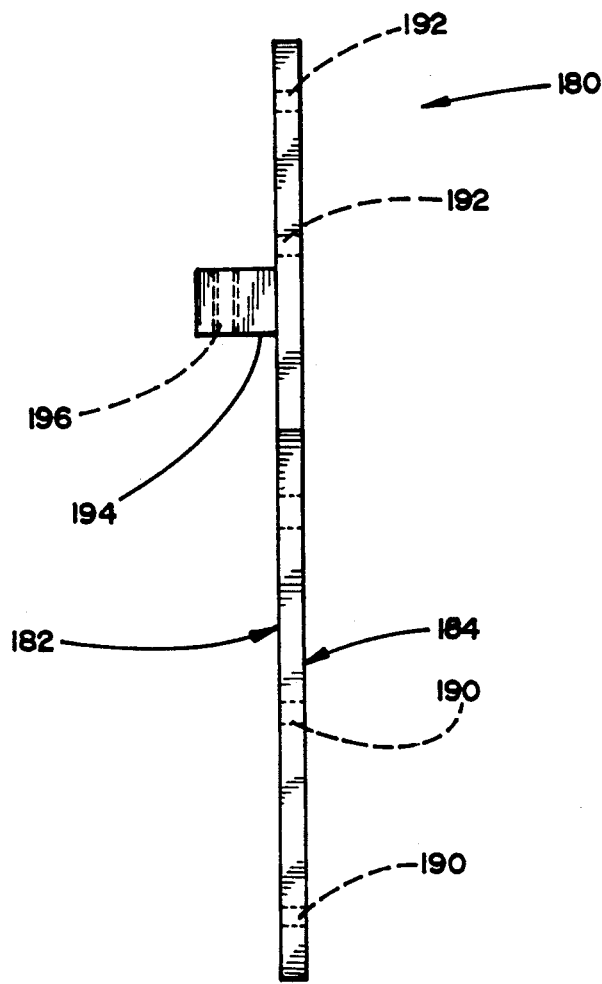
FIG. 23 is an end view of the motor base plate shown in FIG. 22, taken along lines 23—23 of FIG. 22.

The grinder mechanism 104 also includes a motor base plate 180 as shown in FIGS. 12 and 13. Details of the motor base plate are also shown in FIGS. 22 and 23. Referring primarily to FIGS. 22 and 23, the motor base plate 180 has somewhat of a T-shaped configuration (with relatively short "arms") and a planer orientation, with an upper surface 182 and a lower surface 184. The base plate 180 can be characterized as including a first rectangularly-shaped section 186 having a length somewhat greater than its width, and integrally connected co-planer with a further rectangular-shaped section 188. The rectangularly-shaped section 186 includes a series of six apertures 190 through which bolts or similarly connecting means can be secured through the bores 154 so as to rigidly secure the motor slide plate 144 to the motor base plate 180. In addition, the motor base plate 180 includes other apertures 192 for purposes of securing the base plate 180 to other components of the grinder mechanism 104. Further, a pair of upright bosses 194 extend outwardly from the upper surface 182, and include apertures 196 through which connecting means, such as the threaded bolts 198 illustrated in FIG. 22, can be utilized to secure the motor base plate 180 to the motor of the grinder mechanism 104 as subsequently described herein.

Returning to FIGS. 12 and 13, the grinder mechanism 104 includes a conventional grinder motor 200 rigidly mounted on a conventional motor pedestal 202 to the motor base plate 180. As shown in FIG. 12, the grinder motor 200 includes a drive shaft 204 extending laterally outward from the main motor body. A pair of drive pulleys 206 are conventionally secured to the ends of the drive shaft 204. The drive pulleys 206 are interconnected to a pair of grinder shaft drive pulleys 208 through a pair of conventional drive belts 210, as further illustrated in FIG. 12. The grinder shaft drive pulleys 208 are connected at one end of a grinder shaft 212 which extends transversely across a forward end of the grinder mechanism 104. The grinder shaft 212 is supported at intermediate locations along the axial length of the shaft by conventional bearing assemblies 214. The bearing assemblies 214 are mounted by brackets or the like to a plate 216 of a grinding wheel support bracket as described in detail in subsequent paragraphs herein.

At the end of the grinder shaft 212 opposing the end to which the grinder shaft drive pulleys 208 are connected, a grinder belt contact wheel 218 is secured. Mounted between the grinder belt contact wheel 218 and a belt idler wheel 220 is a grinding belt 222 shown in partial structural configuration in FIGS. 12 and 13. The support components for the idler wheel 220 and for the grinder wheel 218 will be described in greater detail in subsequent paragraphs herein. In operation, with the grinder mechanism 104 attached to the previously described support structure 50, the grinder 218 is adjusted so that the grinding belt 222 is engaged in an abutting contact with the liner wall 8 of the hydraulic turbine. The grinder motor 200 can then be activated through conventional electrical controls within a control unit 224 as shown in FIG. 13. It should be emphasized that the grinder mechanism 104 will be positioned on a support structure 50 so that the mechanism 104 is substantially turned on its "side" during operation. That is, the axis of the grinder shaft 212 will substantially be in a vertical configuration. The liner wall 8 can then be ground and sanded as appropriate, with rotation of the grinder mechanism 104 occurring through rotation of the turbine structure utilizing the turbine turning mechanism as previously described herein.

Figure 24:
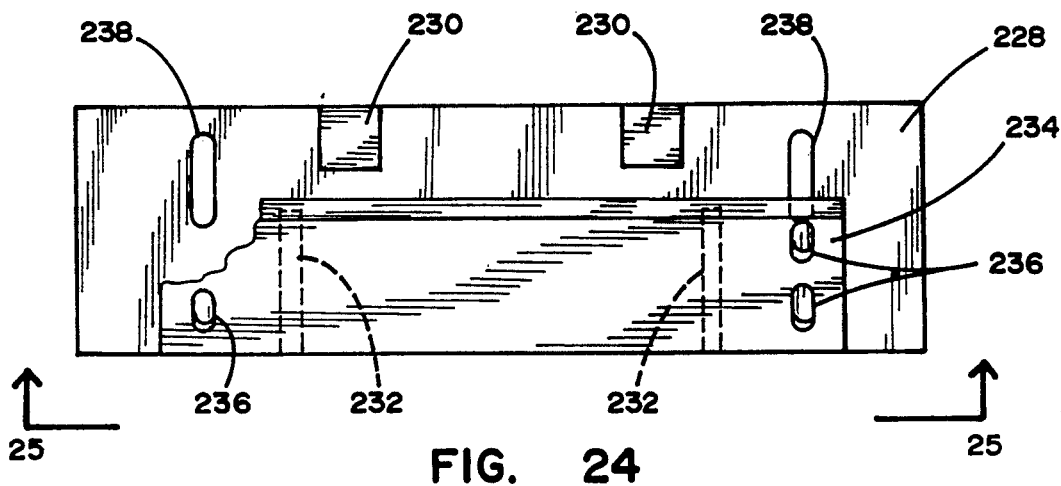
FIG. 24 is a plan view of the grinding wheel support bracket of the grinder mechanism.
Figure 25:
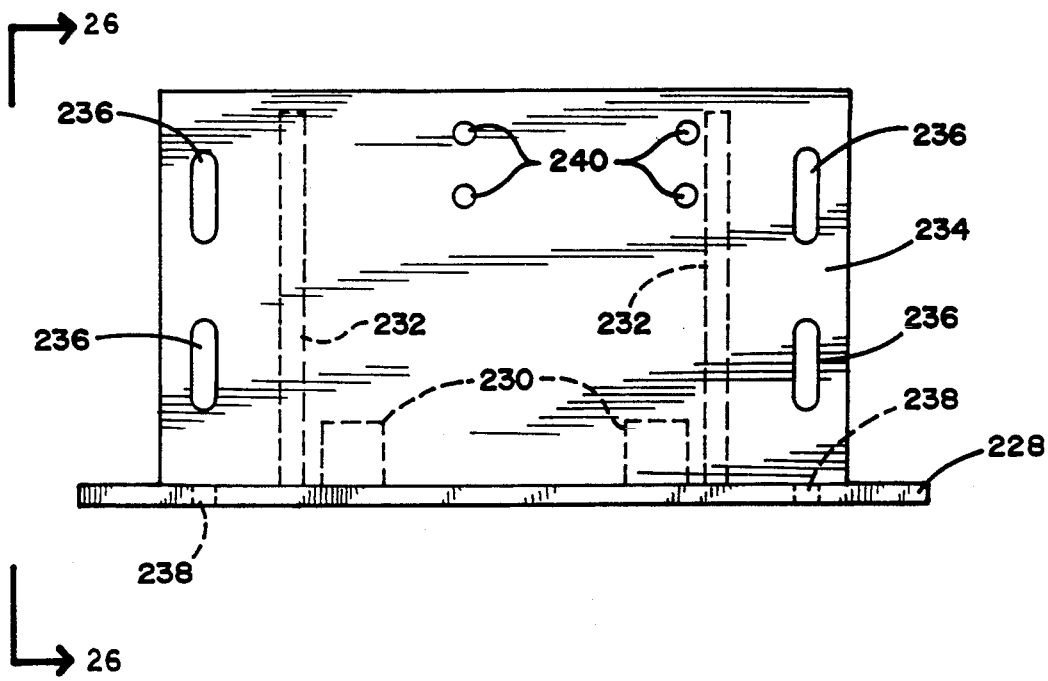
FIG. 25 is an elevation view of the grinding wheel support bracket shown in FIG. 24, taken along lines 25—25 of FIG. 24.
Figure 26:
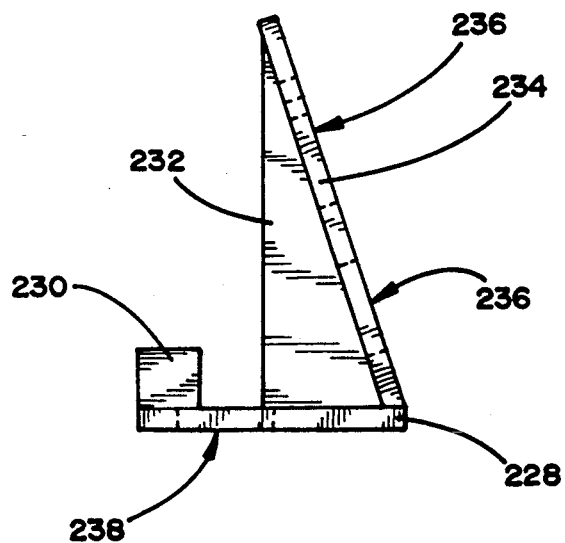
FIG. 26 is an end view of the grinding wheel support bracket shown in FIGS. 24 and 25, taken along lines 26—26 of FIG. 25.

The grinder wheel arrangement as previously described is supported within the grinder mechanism 104 through a grinder wheel support assembly 226 as shown in FIGS. 12 and 13. Details of the support assembly 226 are illustrated in FIGS. 24, 25 and 26. Referring thereto, the support assembly 226 includes a base plate 228 having a rectangular and planar configuration. Mounted to the upper surface of the base plate 228 are a pair of lugs 230. As will be described in subsequent paragraphs herein, the lugs 230 are adapted to provide an abutment against threaded bolts 198 (as shown in FIG. 13) which extend through the bosses 194. In this manner, the support assembly 226 is prevented from any substantial movement toward the motor 200 as illustrated in FIG. 13.

Extending upwardly from the base plate 228 is a pair of vertically disposed supports 232 having a substantially triangular configuration, as primarily shown in FIG. 26. The vertically disposed supports 232 are connected to or otherwise integral with the base plate 228. Integral with or otherwise connected to the vertically disposed supports 232 is an angled support plate 234 having its lower end abutting one edge of the base plate 228 as primarily shown in FIG. 26.

As primarily shown in FIG. 25, the angled support plate includes a series of four aperture slots 236 adapted to receive connecting means (not shown in FIGS. 24, 25 and 26) for purposes of interconnecting other elements of the grinder mechanism 104 as described in subsequent paragraphs therein. The slots 236 are configured so that two of the slots 236 are positioned on each side of the support plate 234. Correspondingly, a pair of similar aperture slots 238 are also positioned adjacent the forward portion of the base plate 228, and extend therethrough. A pair of bolts or similar types of connecting means are inserted through the aperture slots 238 and through the apertures 192 of the motor base plate 180. With the aperture slots 238 having an elongated configuration as primarily illustrated in FIG. 24, the position of the grinder wheel support assembly 226 relative to the motor base plate 180 has a slight range of adjustment, which facilitates appropriate tensioning of the grinder belt and drive belts. Finally, the angled support plate 234 also includes a series of four apertures 240, again for purposes of receiving bolts or similar connecting means for purposes of interconnecting other elements of the grinder mechanism 104 to the support assembly 236.

The grinder mechanism 104 also includes an upper wheel support assembly 242 as illustrated in FIGS. 12 and 13. Details of the upper wheel support assembly 242 are shown in FIGS. 27 and 28. Referring primarily to FIGS. 27 and 28, the upper wheel support assembly 242 includes a substantially vertically disposed connecting bracket 244. The connecting bracket 244 includes a series of four apertures 246 located adjacent corners of the bracket 244. Bolts or similar connecting means, such as the bolts 248 shown in FIG. 13 are received through the apertures 246 and through the apertures 240 of the angled support plate 234, for purposes of securing the upper wheel support assembly 242 to the grinder wheel support assembly 226. In addition to the connecting bracket 244, the support assembly 242 also includes an angled support bar 250 integral with or otherwise connected to the connecting bracket 244, and extending upwardly therefrom at an angle as primarily shown in FIG. 27. As also shown in FIG. 27, the support assembly 242 includes a motor connecting bracket 252 having a vertically disposed section 254 with one end connected to or integral with the lower portion of the angled support bar 250. The opposing end of the vertically disposed section 254 is integral with a right-angled section 256. The right-angled section 256 includes a pair of apertures 258 extending therethrough. The apertures 258 are preferably in the form of elongated slots and are utilized with bolts or similar connecting means (not shown) to secure the upper wheel support assembly 232 to a bracket adjacent the top portion of the motor 200. In this manner, the upper wheel support assembly 242 is provided with substantial supporting strength relative to the motor 200 and the base plate 228 of the grinder wheel support assembly 226.

Referring again to FIGS. 27 and 28, the angled support bar 250 is in the form of a C-shaped channel configuration, with the open portion of the channel angled downwardly. The base portion of the C-shaped channel configuration is designated in FIG. 27 as base portion 260. Extending through the base portion 260 at the upper end of the angled support bar 250 are a pair of apertures 262. In addition to the connecting bracket 244 and angled support bar 250, the upper wheel support assembly 242 also includes an idler wheel adjustment assembly 264. Again referring to FIGS. 27 and 28, the adjustment assembly 264 includes an alignment plate 266 having a pair of aperture slots 268 extending through the plate as primarily shown in FIG. 28. When the adjustment assembly 264 is assembled as shown in FIGS. 12 and 13, bolts 270 as shown in FIG. 12, or similar connecting means, are inserted through the aperture slots 268 and through the apertures 262 of the angled support bar, for purposes of securing the adjustment assembly 264 to the support bar 250. With the elongated configuration of the aperture slots 268, the lateral position of the alignment plate 266 relative to the support bar 250 can be selectively adjusted. With the interconnection of the idler wheel 220 to the alignment plate 266 as described in subsequent paragraphs herein, the lateral alignment of idler wheel 220 can be adjusted as appropriate so as to maintain alignment of the grinding belt 222.

In addition to the alignment plate 266, the adjustment assembly 264 also includes a C-shaped connecting bracket 270 integral with or otherwise connected to the alignment plate 266. The connecting bracket 270 includes a base portion 272 and a pair of leg portions 274 positioned at right angles to the base section 272. As primarily shown in FIG. 27, a series of apertures 276 extend through the base section 272. As will be described in subsequent paragraphs herein, the apertures 276 are adapted to receive bolts or similar connecting means for purposes of interconnecting the C-shaped connecting bracket 270 and alignment plate 266 to the idler wheel 220.

Returning to the overall illustrations of the grinder mechanism 104 as depicted in FIGS. 12 and 13, and is particular shown in FIG. 12, the mechanism 104 can also include a support bar 278 connected to or otherwise integral with the angled support bar 250. The support bar 278 can also include a pair of lugs 280 having apertures therein for receiving a pair of threaded bolts 282. The threaded bolts can be further received within apertures extending through support lugs 284 mounted to adjacent corners of the alignment plate 266. This support bar 278 can be utilized to further maintain the alignment plate 266 in a stable position relative to the angled support bar 250.

Referring to both FIG. 12 and FIG. 13, the grinder mechanism 104 can further include a grinder belt tension adjustment device 286 adapted to provide movement of the idler wheel 220 toward and away from the grinder belt contact wheel 218, for purposes of adjusting the tension of the grinding belt 222. Specifically, the tension adjustment device 286 includes a support housing 288 having a side plate 290 and interconnected end plates 292. The side plate 290 is connected to the base section 272 of connecting bracket 270 through bolts 294 extending through the apertures 276 previously described with respect to FIGS. 27 and 28. Rotatably extending through one of the end plates 292 and terminating at the other of the end plates 292 is an adjustment screw 296 having an outwardly extending shaft 298 with a knurled adjustment knob 300 mounted to the distal end thereof. A slide device 302 is mounted on an elongated shaft 304 extending between the two end plates 292 of the adjustment device 286. The slide device 302 includes a partially threaded area, or a rack and pinion arrangement, which threadably engages the adjustment screw 296. In this manner, as the adjustment screw 296 is rotated, the slide device 302 is made to move axially along the shaft 304 as a result of its threaded engagement with the adjustment screw 296. The slide device 304 is interconnected to an idler wheel shaft 306 which, in turn, rotatably mounts the previously described idler wheel 220.

In operation, the grinder mechanism 104 is mounted to the support structure 50 through the interconnection of the motor adjusting slide assembly 106 to the vertical slide plate 84 as previously described. With this interconnection, the vertical position of the grinder mechanism 104 can be adjusted by means of rotation of the vertical adjusting screws 64 previously described with respect to FIGS. 5 and 6. Correspondingly, by rotation of the adjustment handle 124 interconnected with the threaded motor adjusting screw 116, the horizontal position of the grinder mechanism 104 can be adjusted so as to move the grinder belt contact wheel 218 and grinding belt 222 into appropriate abutment with the surface of the liner wall 8. With the turbine turning mechanism as previously described herein, rotation of the turbine blades will cause corresponding rotation of the repair assembly 16 and circumferential movement of the grinding belt 222 and grinder belt contact wheel 218 around the liner wall surface. When the liner wall surface at a particular horizontal plane has been appropriately machined, the grinder mechanism 104 can be adjusted along the vertical adjusting slide 52 so as to reposition the contact wheel 218 at a differing vertical position. Thereafter, the turbine blade turning mechanism can again be utilized to rotate the turbine blades and cause the grinder mechanism 104 to traverse the liner wall surface, thereby providing additional machining of the surface.

It should be noted that a repair assembly in accordance with the invention can be employed in applications other than hydraulic turbine repair. For example, it is possible to employ a grinder mechanism similar to the grinder mechanism 104 described herein for repair of surfaces in paper mill digesters and similar types of devices. In particular, a repair assembly in accordance with the invention can be employed for machining and resurfacing of various types of curved surfaces, where it is conceivable to mount the repair assembly so as to be rotatable along the surface. Also, a repair assembly in accordance with the invention can be employed with other types of mechanisms, other than the turbine turning mechanism described herein, for purposes of rotation of the turbine blades and corresponding movement of the repair assembly along the surface of the liner wall. Various other additions, substitutions and modifications can be made to a repair assembly in accordance with the invention, without departing from the novel principles of the invention.

It should further be noted that the particular structural configuration as described herein are not meant to be an exhaustive enumeration of the configurations which can be utilized in accordance with the invention. Accordingly, it will be apparent to those skilled in the pertinent art that modifications and variations of the above-described illustrative embodiment of the invention can be effected without departing from the spirit and scope of the novel concepts of the invention.

The embodiments of the invention in which an exclusive property or privilege is claimed are defined as follows:

1. An apparatus adapted for use in a hydroelectric turbine structure comprising a turbine shaft, a generator rotor assembly coupled to an upper portion of said turbine shaft, a turbine blade assembly coupled to a lower portion of said turbine shaft and comprising a plurality of turbine blades extending radially from said turbine shaft, and a turbine chamber having a cylindrical configuration and formed by a vertically disposed turbine liner wall adjacent distal ends of said turbine blades, said apparatus comprising:

means for rotating said turbine blades and said turbine shaft to facilitate repair of pitting and general deterioration of surfaces of said liner wall;

a vertical support structure mounted to one or more of said turbine blades substantially adjacent said liner wall;

a grinder contact wheel;

a grinding belt coupled around said grinder wheel;

energizing means for selectively rotating said grinder contact wheel and, correspondingly, said grinding belt;

support means for mounting said grinder contact wheel, said grinding belt and said energizing means;

adjustable connection means coupled to said support means and to said vertical support structure for mounting said grinder contact wheel to said vertical support structure, and for adjusting the horizontal position of said grinder contact wheel relative to said vertical support structure, with the adjustment being in a radial direction relative to the turbine shaft; and said vertical support structure comprises additional adjustable connection means coupled to said adjustable connection means for adjusting the vertical position of said grinder contact wheel relative to said vertical support structure.

2. An apparatus adapted for use in a chamber having a substantially cylindrical configuration formed by a chamber liner inner wall, for purposes of repairing, resurfacing, or otherwise refinishing said liner wall, said apparatus comprising:

a positioning structure positioned in said chamber;

means for said positioning structure relative to said liner wall to facilitate repair, resurfacing or refinishing of said liner wall;

grinding means mounted to said positioning structure and adapted to engage said liner wall in a grinding fashion for said repair, resurfacing or refinishing of said liner wall;

energizing means for selectively energizing said grinding means; and adjustable connection means for mounting said grinding means and for adjusting said position of said grinding means relative to said positioning structure, with the adjustment being in a substantially radial direction relative to a central axis of said chamber so as to adjust the engagement and disengagement of said grinding means with said liner wall.

3. An apparatus in accordance with claim 2 characterized in that said apparatus comprises additional adjustable connection means coupled to said adjustable connection means for selectively adjusting the axial position of said grinding means relative to said positioning structure, with the adjustment direction being along a line substantially parallel to said central axis of said chamber.

4. An apparatus in accordance with claim 2 characterized in that said grinding means comprises a grinding contact wheel.

5. An apparatus in accordance with claim 4 characterized in that said grinding means further comprises a grinding belt coupled around said grinder contact wheel, and said energizing means is adapted to selectively rotate said grinder contact wheel and, correspondingly, said grinding belt.

6. An apparatus in accordance with claim 2 characterized in that said apparatus further comprises a vertical support structure mounted to said positioning structure substantially adjacent said liner wall.

7. An apparatus in accordance with claim 2 characterized in that said apparatus further comprises support means for mounting said grinding means and said energizing means.

8. An apparatus in accordance with claim 2 characterized in that said apparatus further comprises:

a vertical support structure mounted to said positioning structure substantially adjacent said liner wall;

support means for mounting said grinding means and said energizing means;

additional adjustable connection means coupled to said adjustable connection means for adjusting the position of said contact wheel relative to said vertical support structure, with the adjustment direction being along a line substantially parallel to said central axis of said chamber;

said grinding means comprises a grinder contact wheel and a grinding belt coupled around said grinder contact wheel, and said energizing means is adapted to selectively rotate said grinder contact wheel and, correspondingly, said grinding belt; and said adjustable connection means is coupled to said support means and to said vertical support structure for mounting said grinder contact wheel to said vertical support structure, and for adjusting the position of said grinder contact wheel relative to said vertical support structure, with the adjustment being in a radial direction relative to said central axis of said chamber.

9. An apparatus adapted to use in a chamber having a substantially cylindrical configuration formed by a chamber liner inner wall, for purposes of repairing, resurfacing, or otherwise refinishing said liner wall, said apparatus comprising:

a positioning structure positioned in said chamber;

means for rotating said positioning structure relative to said liner wall to facilitate repair, resurfacing or refinishing of said liner wall;

a vertical support structure mounted to said positioning structure substantially adjacent said liner wall;

grinding means adapted to selectively engage said liner wall in a grinding fashion for said repair, resurfacing or refinishing said liner wall;

energizing means for selectively energizing said grinding means;

support means for mounting said grinding means and said energizing means; and adjustable connection means coupled to said support means and to said vertical support structure for mounting said grinding means to said vertical support structure, and for adjusting the position of said grinding means relative to said vertical support structure, with the adjustment being in a substantially radial direction relative to a central axis of said chamber so as to adjust the engagement and disengagement of said grinding means with said liner wall.

10. An apparatus in accordance with claim 9 characterized in that said vertical support structure comprises additional adjustable connection means coupled to said adjustable connection means for selectively adjusting the axial position of said grinding means relative to said vertical support structure, with the adjustment direction being along a line substantially parallel to said central axis of said chamber.

11. An apparatus in accordance with claim 9 characterized in that said grinding means comprises a grinder contact wheel and a grinding belt coupled around said grinder contact wheel, and said energizing means is adapted to selectively rotate said grinder contact wheel and, correspondingly, said grinding belt.

12. An apparatus in accordance with claim 9 characterized in that said vertical support structure comprises:
a vertical adjusting slide; and
a base plate secured to said vertical adjusting slide and to said positioning structure.

13. An apparatus in accordance with claim 12 characterized in that said vertical adjusting slide comprises:
a support frame having a pair of side walls;
a pair of support flanges extending laterally outward from and integral with or otherwise connected to said side walls;
a plurality of support spars connected to said side walls;
a vertical adjusting screw at least partially enclosed by said support frame and rotatively secured at its lower portion to a lower bearing assembly, with said bearing assembly providing vertical and horizontal support for said adjusting screw, while allowing rotation of said adjusting screw;
said vertical adjusting screw being interconnected at its top portion to an upper bearing assembly, with said upper bearing assembly providing support for said adjusting screw at the upper portion thereof, while also allowing for substantially free rotation of said screw.

14. An apparatus in accordance with claim 13 characterized in that said upper portion of said vertical adjusting screw comprises a drive shaft extending upwardly through said support frame; and
said apparatus further comprises motive means rotatively interconnected with said drive shaft for selectively rotating said vertical adjusting screw.

15. An apparatus in accordance with claim 13 characterized in that said vertical adjusting slide comprises a slide block adapted to be slidably engaged on said vertical adjusting screw, with said slide block adapted to be interconnected with a vertical slide plate.

16. An apparatus in accordance with claim 15 characterized in that:
said vertical slide plate comprises a pair of C-shaped brackets or slide bars, each having an elongated configuration;
each of said C-shaped brackets or slide bars comprising an inwardly directed channel, and positioned so as to be integral with or interconnected to a lower surface of a rectangular section of said vertical slide plate, and with each of said C-brackets being located at opposing sides of a lower surface of said rectangular section, so that said channels are in an opposing relationship.

17. An apparatus in accordance with claim 16 characterized in that said apparatus further comprises a motor adjusting slide assembly having a base connecting plate with a substantially rectangular configuration, and with said base connecting plate having a series of apertures extending through upper and lower surfaces of a connecting plate, and with said base connecting plate adapted to be connected to said vertical slide plate, so as to secure said motor adjusting slide assembly to said vertical slide plate.

18. An apparatus in accordance with claim 17 characterized in that said motor adjusting slide assembly further comprises a threaded motor adjusting screw extending longitudinally along a length of said motor adjusting slide assembly;
said motor adjusting screw being rotatively supported at its distal end by a bearing assembly, with said distal end bearing assembly providing a substantially rigid support for preventing said adjusting screw from any substantial lateral movement, while allowing for substantially free rotation of said adjusting screw;
said motor adjusting screw being further rotatively supported by a forward end bearing assembly at the opposing end of said distal end of said adjusting screw, with said forward end bearing assembly substantially preventing said adjusting screw from any substantial lateral movement, while correspondingly allowing for substantially free rotation of said screw; and
said apparatus further comprises means for allowing manual rotation of said motor adjusting screw.

19. An apparatus in accordance with claim 18 characterized in that said motor adjusting slide assembly further comprises a motor adjusting slide assembly block comprising a substantially rectangular and solid housing having an upper surface, lower surface and opposing side surfaces; and
said slide block is adapted to be adjustably received on said adjusting screw by engagement of the adjusting screw through an aperture of said slide block.

20. An apparatus in accordance with claim 19 characterized in that said motor adjusting slide assembly is adjustably mounted to a motor slide plate, with said motor slide plate comprising:
a rectangular base section having an upper planar surface and a lower planar surface;
a plurality of apertures extending through said upper and lower planar surfaces;
a pair of slide bars, with said rectangular base section and said slide bars forming a pair of channels adapted to receive ledges of said motor adjusting slide assembly so that said motor slide plate can be adjusted along a longitudinal length of said slide assembly.

* * * * *

UNITED STATES PATENT AND TRADEMARK OFFICE
CERTIFICATE OF CORRECTION

PATENT NO. : 5,148,635

DATED : September 12, 1992

INVENTOR(S) : BENNY R. PORTER

It is certified that error appears in the above-identified patent and that said Letters Patent is hereby corrected as shown below:

Claim 2, Col. 23, line 42, after "for" insert --rotating--.

Claim 9, Col. 24, line 43, delete "to" and substitute --for--.

Signed and Sealed this

Twenty-first Day of September, 1993

Attest:

BRUCE LEHMAN

Attesting Officer

Commissioner of Patents and Trademarks